United States Patent
Fujimoto

(10) Patent No.: US 8,826,333 B2
(45) Date of Patent: Sep. 2, 2014

(54) VIDEO DISPLAY DEVICE AND VIDEO DISPLAY METHOD

(75) Inventor: Takaomi Fujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/976,508

(22) PCT Filed: Dec. 26, 2011

(86) PCT No.: PCT/JP2011/080015
§ 371 (c)(1),
(2), (4) Date: Jun. 27, 2013

(87) PCT Pub. No.: WO2012/096122
PCT Pub. Date: Jul. 19, 2012

(65) Prior Publication Data
US 2013/0276030 A1 Oct. 17, 2013

(30) Foreign Application Priority Data

Jan. 11, 2011 (JP) .................................. 2011-003485
Dec. 21, 2011 (JP) .................................. 2011-279153

(51) Int. Cl.
*H04N 5/445* (2011.01)
*G06F 3/00* (2006.01)
*G06F 13/00* (2006.01)

(52) U.S. Cl.
USPC ................... 725/39; 725/38; 725/40; 725/43; 725/52; 725/100; 348/734

(58) Field of Classification Search
USPC ......... 725/38–40, 43, 52, 100, 131, 139, 151; 348/734
See application file for complete search history.

(56) References Cited

U.S. PATENT DOCUMENTS

| | | | |
|---|---|---|---|
| 6,028,600 A * | 2/2000 | Rosin et al. .................... | 715/718 |
| 6,281,940 B1 * | 8/2001 | Sciammarella ............... | 348/564 |
| 6,425,129 B1 * | 7/2002 | Sciammarella et al. ........ | 725/38 |
| 2003/0132911 A1 | 7/2003 | Narioka et al. | |
| 2006/0024021 A1 | 2/2006 | Utsuki et al. | |
| 2007/0046628 A1 * | 3/2007 | Lee et al. ...................... | 345/156 |
| 2007/0165012 A1 * | 7/2007 | Koda ............................ | 345/184 |
| 2008/0010613 A1 | 1/2008 | Narioka et al. | |
| 2008/0259024 A1 * | 10/2008 | Nam et al. .................... | 345/156 |
| 2009/0033807 A1 * | 2/2009 | Sheng et al. .................. | 348/734 |
| 2010/0058223 A1 * | 3/2010 | Price et al. .................... | 715/784 |
| 2010/0228436 A1 | 9/2010 | Nezu et al. | |

FOREIGN PATENT DOCUMENTS

| | | |
|---|---|---|
| JP | 2002-140143 A | 5/2002 |
| JP | 2003-44194 A | 2/2003 |
| JP | 2005-39567 A | 2/2005 |
| JP | 2005-98831 A | 4/2005 |

(Continued)

*Primary Examiner* — Mulugeta Mengesha
(74) *Attorney, Agent, or Firm* — Birch, Stewart, Kolasch & Birch, LLP

(57) ABSTRACT

Provided are a video display device and a video display method, by which a user can easily select a program to be watched even if a numerical keypad is not provided in a remote control device. A display portion displays a video of a program. While the video of the program is displayed on the full screen of the display portion, an operation detection portion detects a rotational operation of a dial provided in a remote control device. When the rotational operation is detected by the operation detection portion, a control portion functions so that while the video of the program is displayed on the display portion, a program list including a plurality of program items associated with different programs is displayed on the display portion.

17 Claims, 15 Drawing Sheets

(56) References Cited

FOREIGN PATENT DOCUMENTS

| JP | 2006-33776 A | 2/2006 |
| JP | 2006-222504 A | 8/2006 |
| JP | 2007-049552 A | 2/2007 |
| JP | 2008-109298 A | 5/2008 |
| JP | 2008-228175 A | 9/2008 |
| JP | 2009-182827 A | 8/2009 |
| WO | WO 99/57890 A1 | 11/1999 |
| WO | WO 2010/073343 A | 7/2010 |

* cited by examiner

VIDEO DISPLAY DEVICE AND VIDEO DISPLAY METHOD

TECHNICAL FIELD

The present invention relates to a video display device and a video display method for displaying a video of a program.

BACKGROUND OF THE INVENTION

In recent years, operations of television receivers have become complicated along with great improvement in functions thereof. Therefore, a technology of improving operability of a remote control device for operating a television receiver by remote control is desired to be developed.

For example, Patent Document 1 discloses a technology in which an upper half region of the touch panel provided in a remote controller is touched by a finger for an operation for sliding clockwise or counterclockwise, then, a control signal for selecting a channel corresponding to this operation is transmitted by infrared rays.

In addition, Patent Document 2 discloses a technology in which a remote control device is provided with a rotatable remote control time ring in a ring shape, and, corresponding to rotation of the remote control time ring, a focus area of an electronic program guide is moved to a different time zone.

Further, Patent Document 3 discloses a technology of allowing a rotational operation direction to coincide with correspondence relationship of ascending/descending orders of switching in a selection target regardless of whether a part subjected to a rotational operation to a rotary type button exists on a right-side half surface or a left-side half surface in the case of performing a switching operation of the selection target, such as switching of channels, by a remote controller having the rotary type button.

Moreover, Patent Document 4 discloses a technology in which a dial slidable and turnable for a side face of a remote control device is provided, such that the dial is turned in a state of being arranged at one slide position and thereby classification of broadcast can be selected, and the dial is turned in a state of being arranged at the other slide position and thereby a channel number can be selected.

PRIOR ART DOCUMENT

Patent Documents

Patent Document 1: Japanese Laid-Open Patent Publication No. 2006-222504
Patent Document 2: Japanese Laid-Open Patent Publication No. 2007-49552
Patent Document 3: Japanese Laid-Open Patent Publication No. 2008-109298
Patent Document 4: Japanese Laid-Open Patent Publication No. 2008-228175

SUMMARY OF THE INVENTION

Problem to be Solved by the Invention

However, the above-described conventional technologies of Patent Documents 1 to 4 are for selecting a channel using a dial but not for displaying a program list directly from a state where a video of a program is displayed on a full screen of a television receiver to allow a user to select a program.

In particular, miniaturization of a remote control device has been desired in recent years. Therefore, a remote control device has been considered on which a numerical keypad for selecting a channel is not provided. In such a case, a method has been desired by which any program is allowed to be selected by one operation or an operation similar thereto (operation of the number of times similar to that of a current remote control device with a numerical keypad) without using the numerical keypad.

In view of the above-described problem, the present invention aims to provide a video display device and a video display method by which a user is easily able to select a program to be viewed even in a case where a numerical keypad is not provided in a remote control device.

Means for Solving the Problem

To solve the above problems, a first technical means of the present invention is a video display device for displaying a video of a program which is selected using a remote control device which does not have a channel selection button corresponding to each channel, comprising: a display portion for displaying the video of the program; an operation detection portion for detecting a rotational operation of a jog dial provided in the remote control device; and a control portion for causing the display portion to display a program list including a plurality of program items associated with different programs while causing the display portion to display the video of the program when the rotational operation is detected by the operation detection portion while the video of the program is displayed on a full screen of the display portion, wherein the control portion causes the display portion to display a video of a program which is selected using the program list by the rotational operation of the jog dial, and a program item included in the program list is a program item of some of programs for which the video is receivable, the control portion causes the display portion to display a program search figure in which the some of programs and programs other than the some of programs are associated in different positions, and causes the display portion to display, when a program is searched using the program search figure, a program list including the program which is searched.

A second technical means is the video display device of the first technical means, wherein the control portion causes the display portion to display the program search figure when the total number of the some of programs and the programs other than the some of programs is the predetermined number or more.

A third technical means is the video display device of the first technical means wherein the control portion causes the display portion to display the program search figure when the operation detection portion detects that the rotational operation is performed for a predetermined time or more.

A fourth technical means is the video display device of the first technical means, wherein the control portion causes the display portion to display the program search figure together with the video of the program and the program list.

A fifth technical means is a video display device for displaying a video of the program, comprising: a display portion for displaying the video of the program; an operation detection portion for detecting a rotational operation of a jog dial provided in a remote control device; and a control portion for causing the display portion to display a program list including a plurality of program items associated with different programs while causing the display portion to display the video of the program when the rotational operation is detected by the operation detection portion while the video of the program is displayed on a full screen of the display portion, wherein a program item included in the program list is a program item of some of programs for which the video is receivable the control portion causes the display portion to display a program search figure in which the some of programs and programs other than the some of programs are associated in different positions, and causes the display portion to display, when a program is searched using the program search figure, a program list including the program which is searched.

A sixth technical means is the video display device of the fifth technical means, wherein the control portion causes the display portion to display a video of a program selected using the program list by the rotational operation of the jog dial.

A seventh technical means is the video display device of the fifth technical means, wherein the control portion causes the display portion to display a program item corresponding to the program selected by the rotational operation of the jog dial in the program list, in a display form which is different from that of a program item corresponding to other programs.

An eighth technical means is the video display device of the fifth technical means, wherein the control portion causes the display portion to display, a video of the program which is selected, when a predetermined button of the remote control device is pressed in a state where one program is selected by the rotational operation of the jog dial.

A ninth technical means is the video display device of the fifth technical means, wherein the control portion causes the display portion to display, a video of the program which is selected, in a case where a predetermined time elapsed in a state where one program is selected by the rotational operation of the jog dial.

A tenth technical means is the video display device of the fifth technical means, wherein the operational detection portion further detects an operation of pressing either of the right side or the left side of the jog dial, and the control portion causes the display portion to display, a program list for a broadcast wave type which is different from a broadcast wave type corresponding to the program list displayed on the display portion, when either of the right side or the left side of the jog dial is pressed in a state where the program list is displayed on the display portion.

An eleventh technical means is the video display device of the tenth technical means, wherein the control portion causes the display portion to display, at right and left positions of the program list, broadcast wave switching information indicating the broadcast wave type which is different from the broadcast wave type corresponding to the program list displayed on the display portion.

A twelfth technical means is the video display device of any one of the first to the seventh the fifth technical means, further comprising: a first tuner portion for selecting a first channel; and a second tuner portion for selecting a second channel, wherein the second tuner portion selects the second channel while the program list is displayed on the display portion and a program corresponding to the first channel selected by the first tuner portion is displayed on the display portion, and the control portion causes the display portion to display, a video of the program corresponding to the second channel when a program corresponding to the second channel is selected by the rotational operation of the jog dial.

A thirteenth technical means is the video display device of the fifth technical means, further comprising: a first tuner portion for selecting a first channel; and a second tuner portion for selecting a second channel, wherein the second tuner portion selects the second channel while the program list is displayed on the display portion and a program corresponding to the first channel selected by the first tuner portion is displayed on the display portion, and the control portion extracts a still image from a video of a program of the second channel selected by the second tuner portion and causes the display portion to display the still image when a program corresponding to the second channel is selected by the rotational operation of the jog dial.

A fourteenth technical means is the video display device of the fifth technical means, wherein the operation detection portion detects rotational speed of the jog dial, and the control portion changes the number of the program items to be displayed on the display portion according to the rotational speed detected by the operation detection portion.

A fifteenth technical means is the video display device of the fifth technical means, wherein the operation detection portion adjusts an output value of a rotational amount of the jog dial according to information on an operator's ability for operation of the remote control device and detects the rotational operation based on the adjusted output value.

A sixteenth technical means is the video display device of the fifth technical means, wherein the operation detection portion adjusts the output value of the rotational amount of the jog dial according to a form and/or size of the remote control device, and detects the rotational operation based on the adjusted output value.

A seventeenth technical means is a video display method of displaying a video of a program, comprising: an operation detection step of detecting a rotational operation of a jog dial provided in a remote control device; and a program list display step of causing the display portion to display a program list including a plurality of program items associated with different programs while causing the display portion to display the video of the program when the rotational operation is detected while the video of the program is displayed on a full screen of the display portion for displaying the video of the program at the operation detection step, wherein a program item included in the program list is a program item of some of programs for which the video is receivable, and at the program list display step, a program search figure in which the some of programs and programs other than the some of programs are associated in different positions is displayed on the display portion, and when a program is searched using the program search figure, a program list including the program which is searched is displayed on the display portion.

Effect of the Invention

According to the present invention, it is possible to display a selected screen of the program by one operation and improve convenience for a user even in a case where a numerical keypad is not provided in a remote control device, since a program list including a plurality of program items associated with different programs is displayed on the display portion while causing the display portion to display the above-described video of the program, in a case where a rotational operation of a jog dial provided in a remote control device is detected while a video of a program is displayed on the full screen of a display portion for displaying the video of the program. Moreover, it is possible to further improve convenience for the user since the user is able to select a program by performing a similar operation in succession.

PREFERRED EMBODIMENT OF THE INVENTION

Figure 1:
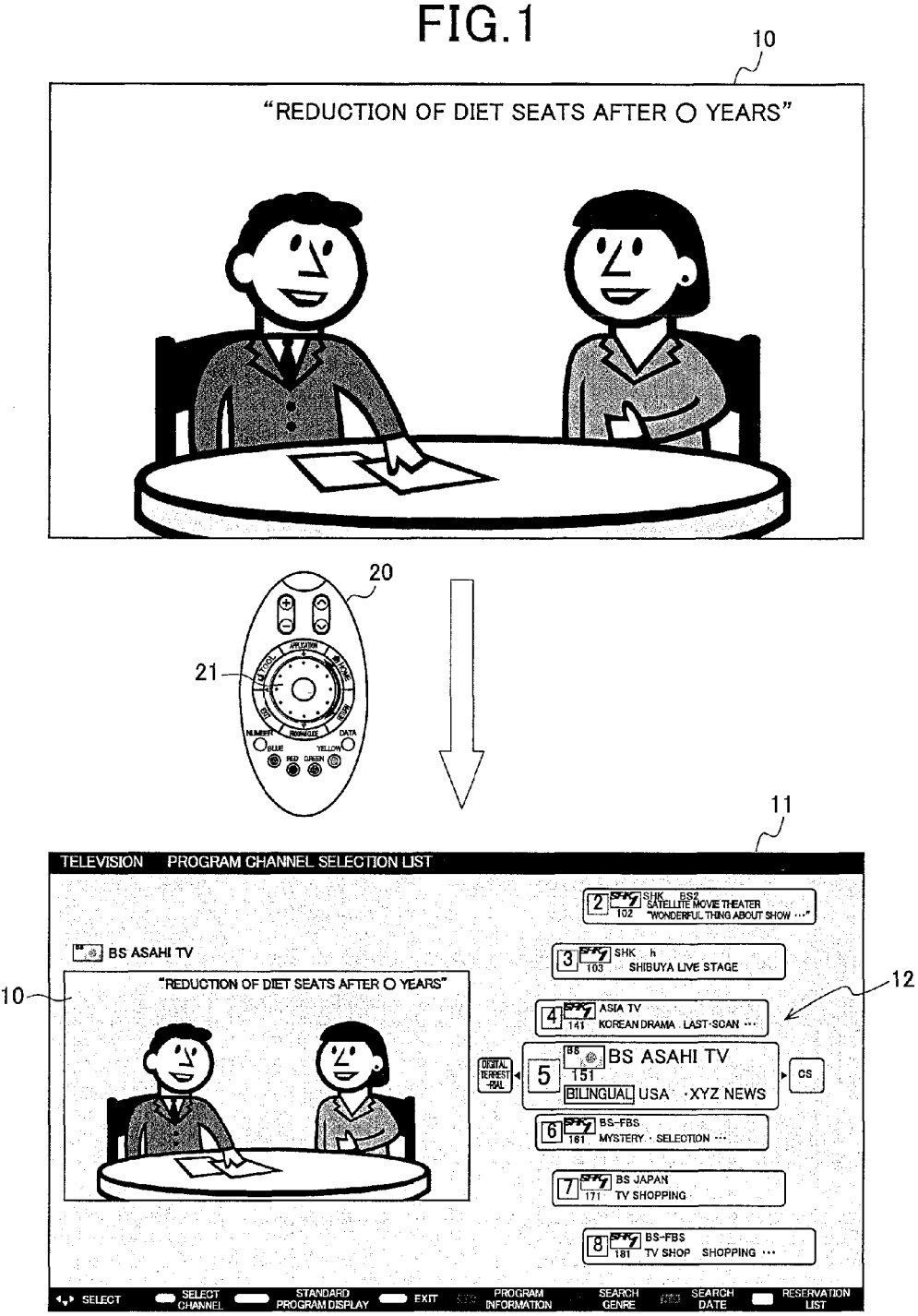
FIG. 1 is a diagram explaining a concept of video display processing according to an embodiment of the present invention.

Hereinafter, description will be given in detail for embodiments of the present invention with reference to the drawings. FIG. 1 is a diagram explaining a concept of video display processing according to an embodiment of the present invention. As shown in FIG. 1, when a user rotates a jog dial 21 provided in a remote control device 20 while a program video 10 is displayed on the full screen of a video display device, a program selection screen 11 is displayed. On the program selection screen 11, the program video 10 is reduced and displayed, and a program list 12 is displayed on the right side of the program video 10. When a user selects a program by a rotational operation of the jog dial 21 with reference to the program list 12, a video of the selected program is displayed on the full screen of the video display device.

Figure 2:
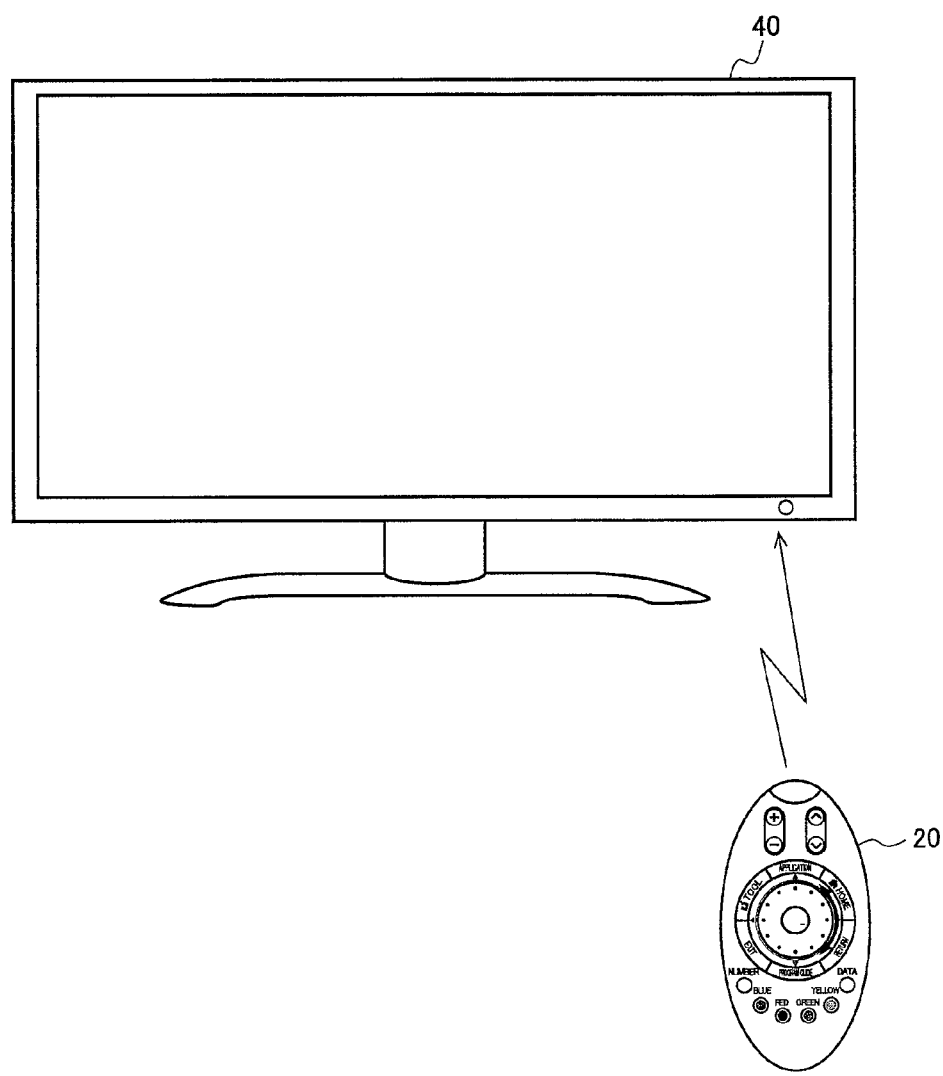
FIG. 2 is a diagram showing an example of a video display device and a remote control device provided in the video display device according to the present embodiment.

Next, description will be given for configurations of a video display device 40 and the remote control device 20 according to the present embodiment. FIG. 2 is a diagram showing an example of the video display device 40 and the remote control device 20 provided in the video display device 40 according to the present embodiment. When a user operates the remote control device 20, the video display device 40 receives a remote control signal indicating what kind of operation is performed from the remote control device 20, and executes a wide variety of processing related to video display corresponding to the remote control signal.

Figure 3:
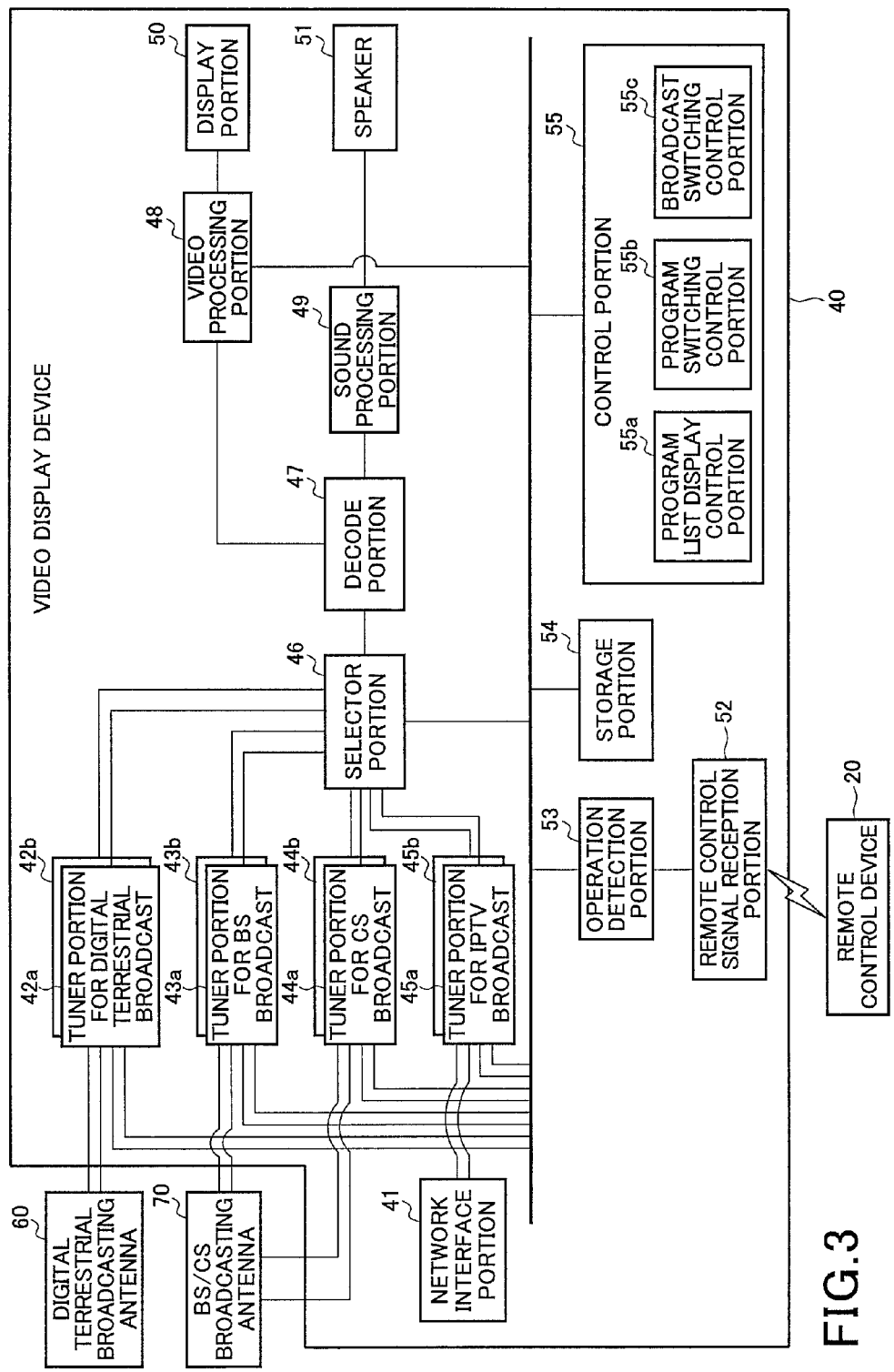
FIG. 3 is a diagram showing an example of a configuration of the video display device according to the present embodiment.

FIG. 3 is a diagram showing an example of a configuration of the video display device 40 according to the present embodiment. As shown in FIG. 3, a digital terrestrial broadcasting antenna 60 and a BS/CS broadcasting antenna 70 are connected to the video display device 40. Further, the video display device 40 is provided with the remote control device 20 shown in FIG. 2. The digital terrestrial broadcasting antenna 60 is an antenna for receiving a digital terrestrial broadcast. The BS/CS broadcasting antenna 70 is an antenna for receiving a BS broadcast and a CS broadcast.

The video display device 40 is provided with a network interface portion 41, tuner portions for digital terrestrial broadcast 42a and 42b, tuner portions for BS broadcast 43a and 43b, tuner portions for CS broadcast 44a and 44b, tuner portions for IPTV broadcast 45a and 45b, a selector portion 46, a decode portion 47, a video processing portion 48, a sound processing portion 49, a display portion 50, a speaker 51, a remote control signal reception portion 52, an operation detection portion 53, a storage portion 54 and a control portion 55. The video display device 40 is provided with two tuner portions for digital terrestrial broadcast 42a and 42b, two tuner portions for BS broadcast 43a and 43b, two tuner portions for CS broadcast 44a and 44b, and two tuner portions for IPTV broadcast 45a and 45b so that a user is able to view at the same time two programs for each of a digital terrestrial broadcast program, a BS broadcast program, a CS broadcast program and an IPTV broadcast program.

Note that, the video display device 40 is not limited thereto, and may include one each of a tuner portion for digital terrestrial broadcast, a tuner portion for BS broadcast, a tuner portion for CS broadcast and a tuner portion for IPTV broadcast.

Moreover, the video display device 40 is comprised of the tuner portions for digital terrestrial broadcast 42a and 42b, the tuner portions for BS broadcast 43a and 43b, the tuner portions for CS broadcast 44a and 44b, and the tuner portions for IPTV broadcast 45a and 45b herein, however, may be provided with a tuner device including the tuner portions for digital terrestrial broadcast 42a and 42b, the tuner portions for BS broadcast 43a and 43b, the tuner portions for CS broadcast 44a and 44b and the tuner portions for IPTV broadcast 45a and 45b outside the video display device 40. In this case, the video display device 40 is connected to the tuner device by, for example, a Wi-Fi (registered trademark) connection or the like to exchange data, however, not allowed for view of a program in a case where the Wi-Fi connection is not provided, and thus may not display the program list 12.

The network interface portion 41 is an interface portion for transmitting/receiving data to/from a server device delivering an IPTV broadcast via a network. The tuner portions for digital terrestrial broadcast 42a and 42b are tuner portions for selecting a channel of a program to be viewed by a user from among digital terrestrial broadcasts received by the digital terrestrial broadcasting antenna 60. The tuner portions for BS broadcast 43a and 43b are tuner portions for selecting a channel of a program to be viewed by a user from among BS broadcasts received by the BS/CS broadcasting antenna 70. The tuner portions for CS broadcast 44a and 44b are tuner portions for selecting a channel of a program to be viewed by a user from among CS broadcasts received by the BS/CS broadcasting antenna 70. The tuner portions for IPTV broadcast 45a and 45b are tuner portions for selecting a channel of a program to be viewed by a user from among programs having video data that is transmitted by the server device delivering an IPTV broadcast.

The selector portion 46 is a processing portion for selecting a broadcast signal of a program to be viewed by a user from among a digital terrestrial broadcast signal, a BS broadcast signal, a CS broadcast signal and an IPTV broadcast signal each output from the tuner portions for digital terrestrial broadcast 42a and 42b, the tuner portions for BS broadcast 43a and 43b, the tuner portions for CS broadcast 44a and 44b, and the tuner portions for IPTV broadcast 45a and 45b to output the selected broadcast signal to the decode portion 47. The decode portion 47 is a processing portion for decoding the broadcast signal received from the selector portion 46, outputting a video signal obtained as a result of decoding to the video processing portion 48, and outputting an audio signal obtained as a result of decoding to the sound processing portion 49.

The video processing portion 48 is a processing portion for performing signal processing in order to process the video signal received from the decode portion 47. For example, the video processing portion 48 performs processing for reducing and enlarging a screen, adjusting image quality such as colors and luminance of a video, displaying an OSD (On Screen Display) screen such as display of a menu, a channel and the like, superposing the OSD screen and a video, and the like. Further, when a user rotates the jog dial 21 of the remote control device 20 shown in FIG. 1, the video processing portion 48 reduces the program video 10 shown in FIG. 1, while performing signal processing for a video signal so that the program list 12 is arranged on the right side of the program video 10. The sound processing portion 49 is a processing portion for performing signal processing in order to process the audio signal received from the decode portion 47. For example, the sound processing portion 49 performs processing for changing a frequency characteristic of the audio signal received from the decode portion 47 to emphasize a high sound area and a low sound area of the audio signal.

The display portion 50 is a display device such as a liquid crystal display for receiving a video signal from the video processing portion 48 to display a video corresponding to the received video signal on the liquid crystal display. The speaker 51 is a speaker for outputting audio. The remote control signal reception portion 52 is a processing portion for receiving from the remote control device 20, in a case where a user operates the remote control device 20, a remote control signal indicating what kind of operation is performed. For example, the remote control signal reception portion 52 receives a signal indicating that a rotational operation of the jog dial 21 of the remote control device 20 is performed, a signal indicating that an upper side, a lower side, a left side or a right side of the jog dial 21 is pressed, a signal indicating that a decision button 22, a return button 23 or an exit button 24 is pressed, and the like. The remote control signal is transmitted using infrared rays, for example.

The operation detection portion 53 is a processing portion for analyzing the remote control signal received by the remote control signal reception portion 52 to detect an operation performed by a user for the remote control device 20. For example, the operation detection portion 53 detects an operation for rotating the jog dial 21 of the remote control device 20, an operation for pressing the upper side, the lower side, the right side or the left side of the jog dial 21, an operation for pressing the decision button 22, the return button 23 or the exit button 24, or the like, which is performed by a user.

The storage portion 54 is a storage device such as a memory. The storage portion 54 stores firmware used for controlling the video display device 40 by the control portion 55, a wide variety of data required for such control, and the like. The control portion 55 is a processing portion for entirely controlling the video display device 40. The control portion 55 is comprised of a processor such as a CPU (Central Processing Portion), for example. The control portion 55 includes a program list display control portion 55a, a program switching control portion 55b and a broadcast switching control portion 55c.

The program list display control portion 55a is a processing portion for performing control processing for controlling the video processing portion 48 to display the program list 12 including each program item 13 on the display portion 50 when the operation detection portion 53 detects a rotational operation of the jog dial 21 of the remote control device 20 that is performed by a user during displaying the program video 10 on the full screen of the display portion 50.

The program switching control portion 55b is a processing portion for performing switching control of a program when a user selects a program by performing a rotational operation of the jog dial 21 or an operation for pressing the upper side or the lower side of the jog dial 21 with reference to the program list 12. Specifically, the program switching control portion 55b performs processing for controlling the tuner portions for digital terrestrial broadcast 42a and 42b, the tuner portions for BS broadcast 43a and 43b, the tuner portions for CS broadcast 44a and 44b and the tuner portions for IPTV broadcast 45a and 45b to switch a video of a program that has been displayed on the display portion 50 until then to a video of a program selected by the user and switch an audio signal of a program that has been output from the speaker 51 to audio of the program selected by the user.

The broadcast switching control portion 55c is a processing portion for performing switching control of broadcasts when a user selects a broadcast to be viewed by performing an operation for pressing the right side or the left side of the jog dial 21, or the like. Specifically, the broadcast switching control portion 55c performs processing for controlling the selector portion 46 to switch a digital terrestrial broadcast, a BS broadcast, a CS broadcast or an IPTV broadcast that has been selected until then to a digital terrestrial broadcast, a BS broadcast, a CS broadcast or an IPTV broadcast selected by a user.

Figure 4:
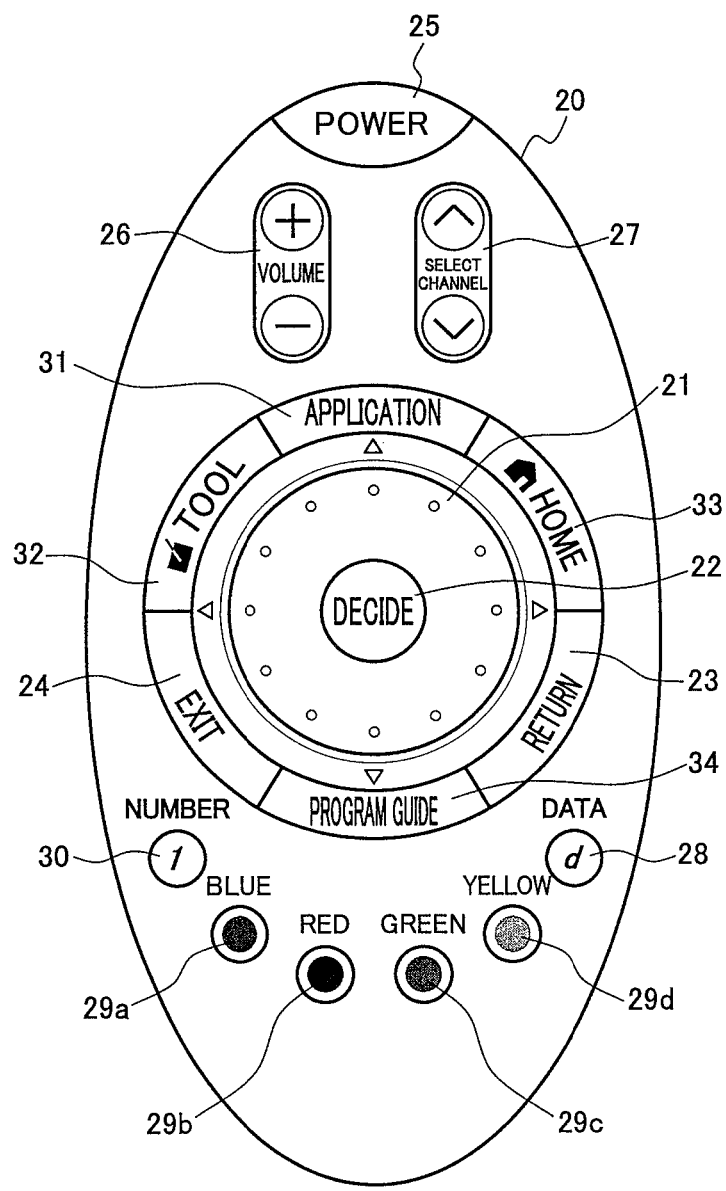
FIG. 4 is a diagram showing an example of the remote control device.

FIG. 4 is a diagram showing an example of the remote control device 20. As shown in FIG. 4, the remote control device 20 is provided with the jog dial 21, the decision button 22, the return button 23, the exit button 24, a power on/off button 25, a volume up/down button 26, a channel selection up/down button 27, a data broadcast display button 28, data broadcast color keys 29a to 29d, a number button 30, an application button 31, a tool button 32, a home button 33, a program guide button 34 and the like.

The jog dial 21 is a jog dial for detecting a rotational amount or a rotation angle of a rotational operation performed by a user, thereby detecting an operational amount by a user. Moreover, the jog dial 21 also includes a function for detecting, in a case where any of upper, lower, right and left parts viewed from a rotation central portion of the dial is pressed, that the upper, lower, right or left part is pressed. The jog dial 21 is used for manually inputting an operational amount according to a rotational amount or a rotation angle. Further, the jog dial 21 is also used for an action for pressing an upper, lower, right or left part, thereby selecting each of items, settings and the like. The decision button 22 is a button for mainly deciding a selected item. The return button 23 is a button for mainly returning screen display to last screen display. The exit button 24 is a button for mainly finishing selection processing of an item.

Further, the power on/off button 25 is a button for powering on/off the video display device 40. The volume up/down button 26 is a button for controlling audio volume output from the speaker 51. The channel selection up/down button 27 is a button for switching channels of broadcast waves one by one. The data broadcast display button 28 is a button for displaying a data broadcast on the screen. The data broadcast color keys 29a to 29d are buttons used for selecting an item allocated to each of the data broadcast color keys 29a to 29d at the time of display of a data broadcast.

Additionally, the number button 30 is a button for displaying a numerical keypad for inputting numbers. The application button 31 is a button for starting an application that is allocated to the application button 31. The tool button 32 is a button for displaying a screen for causing a user to select a function of the video display device 40 that is available by the user. The home button 33 is a button for switching display of a screen to a home screen. The program guide button 34 is a button for displaying a program guide.

The remote control device 20 is configured to allow switching of channels and broadcasts to be easily executed only by an operation of the jog dial 21 as described below without including each number key indicating 0 to 9 for directly inputting a number allocated to a channel to be viewed and a dedicated key for switching a plurality of broadcasts that is used only for switching the type of broadcasts (a digital terrestrial broadcast, a BS (Broadcasting Satellite) broadcast, a CS (Communications Satellite) broadcast and an IPTV (Internet Protocol Television) broadcast).

Hereinafter, description will be given for functions of the jog dial 21, the decision button 22, the return button 23 and the exit button 24 in the case of performing a channel selection operation. When a user performs a rotational operation while the program video 10 is displayed on the full screen of the display portion 50, the jog dial 21 is allowed to display the program list 12 on the display portion 50 while moving items of a program included in the program list 12 up and down. Further, when a left side or a right side of the jog dial 21 is pressed, the type of broadcasts is switched. Moreover, when an upper side or a lower side of the jog dial 21 is pressed, items of a program included in the program list 12 are moved up and down as with the case of performing the rotational operation of the jog dial 21, which will be described in detail below with reference to FIG. 5.

When the rotational operation of the jog dial 21 is performed, or the decision button 22 is pressed in a state where the upper side or the lower side of the jog dial 21 is pressed and a program is thereby selected, the program video 10 of the selected program is displayed on the full screen of the display portion 50. When the return button 23 or the exit button 24 is pressed, display of the program list 12 is finished, and the program video 10 of a program that has been selected before the program list 12 is displayed is displayed again on the full screen of the display portion 50.

Figure 5:
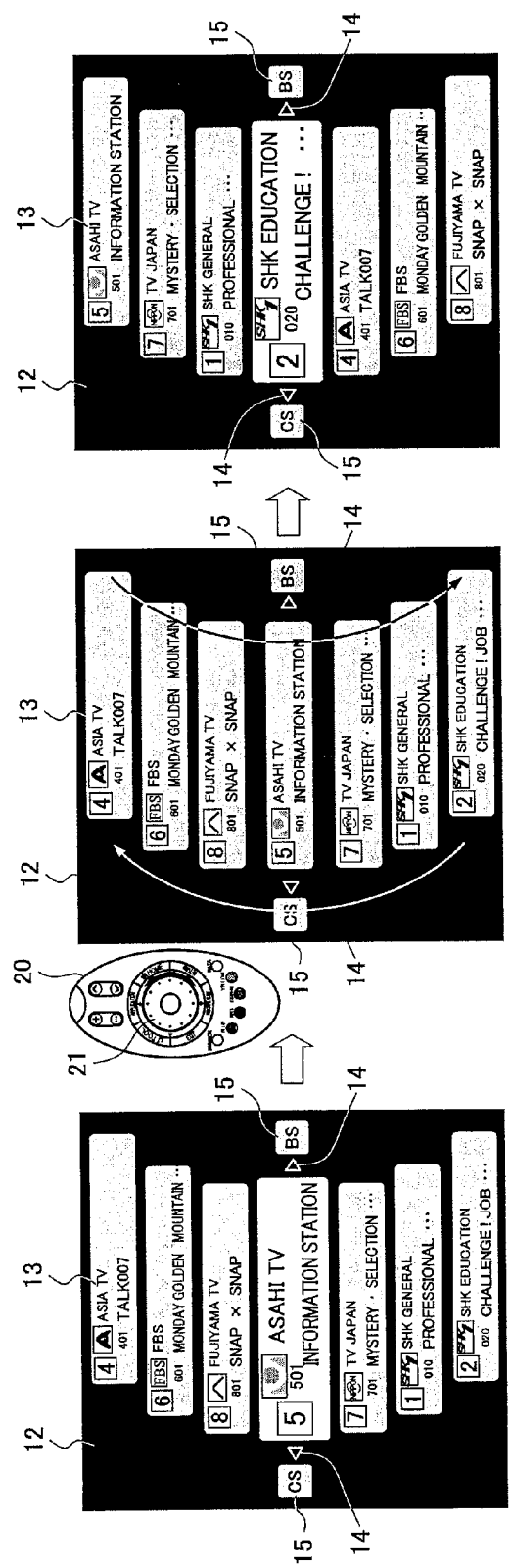
FIG. 5 is a diagram explaining an example of a program list.
Figure 6:
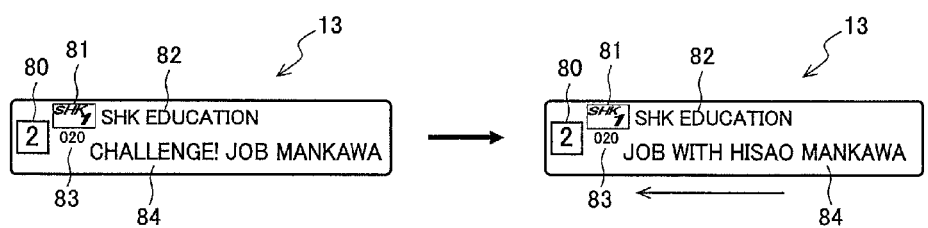
FIG. 6 is a diagram explaining an example of a program item indicating each program.

FIG. 5 is a diagram explaining an example of the program list 12. FIG. 6 is a diagram explaining an example of the program item 13 indicating each program. As shown in FIG. 5, the program list 12 includes the program item 13, arrow marks 14 and broadcast wave switching information 15. The program item 13 is an item indicating each program of a channel to be selected. The arrow marks 14 are information indicating that there is a broadcast wave that is switchable by pressing the right side or the left side of the jog dial 21. The broadcast wave switching information 15 is information indicating the type of each broadcast wave to be switched.

Then, as shown in FIG. 6, in the program item 13, a channel number 80, a broadcast station logo 81, a broadcast station name 82, a triple-digit channel number 83 and a program name 84 are displayed. Here, in a case where the program name 84 is too long to be displayed within the program item 13, the program name 84 is displayed by telop for scrolling laterally. FIG. 6 shows an example where the program name 84 is scrolled from right to left since the program name 84 which is "Challenge a job!—Operate convenience stores with Hisao Mankawa" is not displayable within the program item 13.

As described in FIG. 1, when a user rotates the jog dial 21 included in the remote control device 20 during displaying the program video 10 on the full screen of the display portion 50, the program list 12 as shown in FIG. 5 is displayed. Note that, the jog dial 21 is required to be rotated at greater than or equal to a predetermined angle in order to be recognized that a user rotated the jog dial 21.

Here, the predetermined angle may be set to a minimum angle of a rotation angle of the jog dial 21 that is detectable by the remote control device 20 and the operation detection portion 53. In this case, a user starts a rotational operation of the jog dial 21 and at the same time, the program list 12 is displayed, which thus results in a quicker response and a better operational feeling. Further, the predetermined angle may be set to an angle of about 30 degrees, 45 degrees or 90 degrees which is recognizable that a user purposely rotates the jog dial 21. Setting of the above-described predetermined angle to such an angle allows prevention of an erroneous operation when a user erroneously touches the jog dial 21 while holding a certain level of responsiveness. Additionally, the predetermined angle may be an angle of about a half turn (180 degrees) that is enough to recognize that a user rotates the jog dial 21. Thereby, even a user like a child or an old person who is not good at a detailed operation is able to preferably perform a stable operation. Further, the display portion 50 may display a menu screen or the like for setting the above-described predetermined angle, and the program list display control portion 55a receives information of an angle that is input by a user using a numerical keypad that is displayed by pressing the number button 30 of the remote control device 20 or the like, thereby setting the angle as the above-described predetermined angle. This makes it possible to flexibly respond to preferences of a user or a change in setting.

Note that, as shown in FIG. 5, when the program list 12 is first displayed, in the center of the program list 12, the program item 13 for the program video 10 that has been displayed when a user rotated the jog dial 21 (program item for a program of Channel "5" of a digital terrestrial broadcast in the example of FIG. 5) is displayed larger than the other program items in a color different from colors of the other program items.

Then, when a user further rotates the jog dial 21, all the program items 13 are equally displayed in size, and each program item 13 moves up and down according to rotation of the jog dial 21. Specifically, when clockwise rotation of the jog dial 21 performed by a user results in movement across three programs, the program item 13 of Channel "5" that has been displayed in the center moves across three programs in an upper direction, and in the center, the program item 13 of Channel "2" that has been displayed three programs under the program item 13 of Channel "5" is displayed. Then, below the center, the program items 13 of Channels "4", "6" and "8" are displayed. FIG. 5 shows an example where there are seven programs for a broadcast wave of a digital terrestrial broadcast, however, in the case of having more than seven programs, some of the program items 13 may not be displayed on the screen. For example, in the case of having eight programs, one program item 13 is not displayed on the screen. Here, description has been given for the case where a user rotates the jog dial 21 in a clockwise direction, however, when a user rotates the jog dial 21 in a counterclockwise direction, the same processing as that in a clockwise direction is executed only having a difference from the processing in the clockwise direction in that each program item 13 moves downward.

When a user stops the rotational operation of the jog dial 21, movement of the program item 13 also stops, and the program item 13 in the center of the program list 12 (program item for a program of Channel "2" in the example of FIG. 5) is displayed larger than the other program items 13 in a color different from colors of the other program items. When a user presses the decision button 22 of the remote control device 20 in this state, the program video 10 of the program is displayed on the full screen of the display portion 50.

In this manner, the display portion 50 displays the program item 13 in the center of the program list 12 in a display form different from that of the other program items 13, so that it is possible for a user to easily recognize which program is selected at that time. Further, when a user presses the decision button 22, the display portion 50 displays the program video 10 of the program that has been selected at the moment, so that the user is able to appropriately display a desired program to be viewed.

Figure 7:
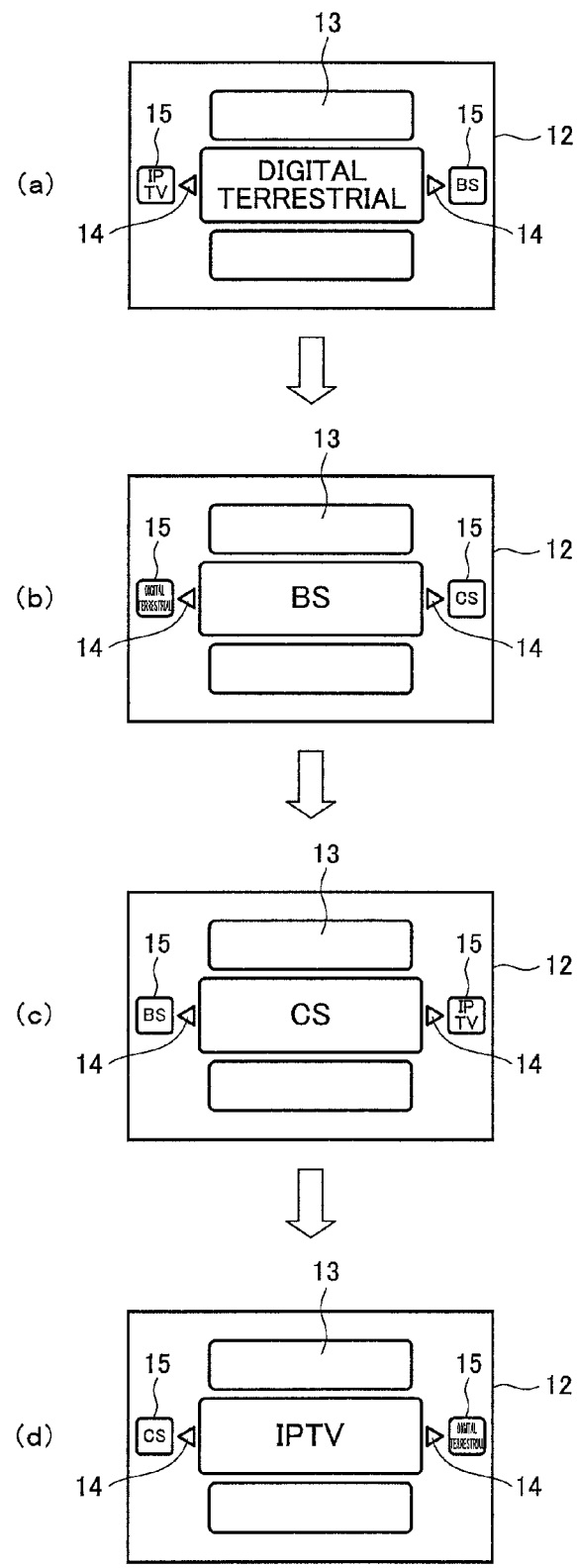
FIG. 7 is a diagram explaining switching of a broadcast wave type.

Moreover, when a left side or a right side of the jog dial 21 is pressed in a state where the program list 12 is displayed, a broadcast wave type is switched. FIG. 7 is a diagram explaining an example of switching processing of the broadcast wave type in a case where the video display device 40 is capable of receiving the IPTV broadcast. In the processing shown in FIG. 7, the video display device 40 is connected to the Internet for allowing program information to be received from a server device delivering an IPTV broadcast of an IPTV broadcasting organization.

In a case where the program list 12 is displayed when a digital terrestrial broadcast is viewed, as shown in FIG. 7, the program item 13 of a program broadcasted from the digital terrestrial broadcast is displayed in the center part, and the arrow marks 14 and the broadcast wave switching information 15 indicating an IPTV broadcast and a BS broadcast are displayed on right and left sides thereof, respectively (see FIG. 7(*a*)). When the right side of the jog dial 21 is pressed in this state, a broadcast wave type of a program to be viewed is switched from the digital terrestrial broadcast to the BS broadcast. Further, when the left side of the jog dial 21 is pressed, the broadcast wave type of the program to be viewed is switched from the digital terrestrial broadcast to the IPTV broadcast. When the broadcast wave type is switched to the BS broadcast, the program item 13 of the program broadcasted from the BS broadcast is displayed in the center part, and the arrow marks 14 and the broadcast wave switching information 15 indicating the digital terrestrial broadcast and a CS broadcast are displayed on right and left sides thereof, respectively (see FIG. 7(*b*)).

Further, when the right side of the jog dial 21 is pressed in this state, the broadcast wave type of the program to be viewed is switched from the BS broadcast to the CS broadcast. When the broadcast wave type is switched to the CS broadcast, the program item 13 of the program broadcasted from the CS broadcast is displayed in the center part, and the arrow marks 14 and the broadcast wave switching information 15 indicating the BS broadcast and the IPTV broadcast are displayed on right and left sides thereof, respectively (see FIG. 7(*c*)). Thereafter, when the right side of the jog dial 21 is pressed, the broadcast wave type of the program to be viewed is switched from the CS broadcast to the IPTV broadcast. When the broadcast wave type is switched to the IPTV broadcast, the program item 13 of the program broadcasted from the IPTV broadcast is displayed in the center part, and the arrow marks 14 and the broadcast wave switching information 15 indicating the CS broadcast and the digital terrestrial broadcast are displayed on right and left sides thereof, respectively (see FIG. 7(*d*)).

Figure 8:
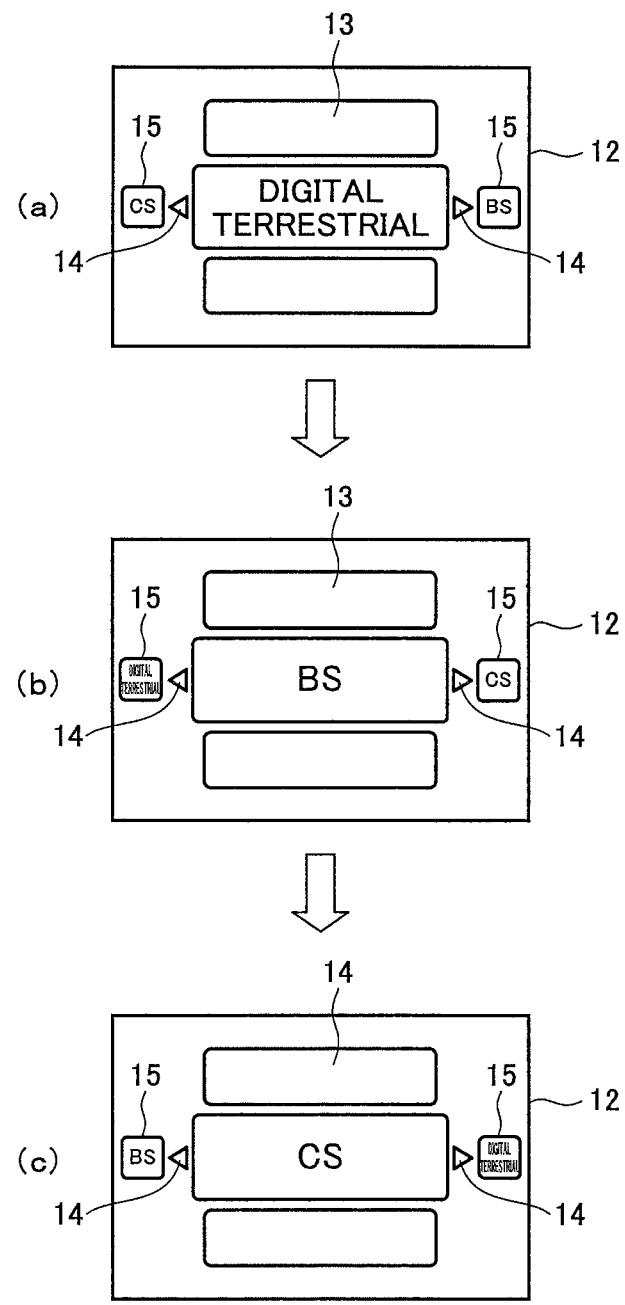
FIG. 8 is a diagram explaining switching of the broadcast wave type.

On the other hand, when the video display device 40 is not capable of receiving the IPTV broadcast, the broadcast wave switching information 15 for switching the broadcast to the IPTV broadcast is not displayed. FIG. 8 is a diagram explaining an example of switching processing of the broadcast wave type in a case where the video display device 40 is not capable of receiving the IPTV broadcast. The processing shown in FIG. 8 is performed in a case where the video display device 40 is not connected to the Internet, or a user does not close a contract for viewing the IPTV broadcast with an IPTV broadcast organization so that program information is not able to be received from a server device providing the IPTV broadcast even though the video display device 40 is connected to the Internet.

As shown in FIG. 8, when the program list 12 is displayed in a case where the digital terrestrial broadcast is viewed, the program item 13 of the program broadcasted from the digital terrestrial broadcast is displayed in the center part, and the arrow marks 14 and the broadcast wave switching information 15 indicating the CS broadcast and the BS broadcast are displayed on right and left sides thereof, respectively (see FIG. 8(*a*)). When the right side of the jog dial 21 is pressed in this state, the broadcast wave type of the program to be viewed is switched from the digital terrestrial broadcast to the BS broadcast. Further, when the left side of the jog dial 21 is pressed, the broadcast wave type of the program to be viewed is switched from the digital terrestrial broadcast to the CS broadcast. When the broadcast wave type is switched to the BS broadcast, the program item 13 of the program broadcasted from the BS broadcast is displayed in the center part, and the arrow marks 14 and the broadcast wave switching information 15 indicating the digital terrestrial broadcast and the CS broadcast are displayed on right and left sides thereof, respectively (see FIG. 8(*b*)).

Additionally, when the right side of the jog dial 21 is pressed in this state, the broadcast wave type of the program to be viewed is switched from the BS broadcast to the CS broadcast. When the broadcast wave type is switched to the CS broadcast, the program item 13 of the program broadcasted from the CS broadcast is displayed in the center part, and the arrow marks 14 and the broadcast wave switching information 15 indicating the BS broadcast and the digital terrestrial broadcast are displayed on right and left sides thereof, respectively (see FIG. 8(*c*)). In this manner, when the video display device 40 is not capable of receiving the IPTV broadcast, the broadcast wave switching information 15 for switching a broadcast to the IPTV broadcast is not displayed. Display of extra information is not performed in this manner, so that operability for a user who selects a desired program to be viewed is improved.

Note that, in a case where a user does not install an antenna for the BS broadcast or the CS broadcast and the video display device 40 is not capable of receiving the BS broadcast or the CS broadcast, the program item 13 of the BS broadcast or the CS broadcast and the broadcast wave switching information 15 for switching a broadcast to the BS broadcast or the CS broadcast are displayed, however, a broadcast station name is only displayed in the program item 13 of the BS broadcast or the CS broadcast, and the program name is not displayed. Such a process is provided for conforming the processing to processing in a conventional remote control device including a dedicated button for directly switching a broadcast to the BS broadcast or the CS broadcast. However, the processing is not limited thereto, and in a case where the video display device 40 is not capable of receiving the BS broadcast or the CS broadcast, the program item 13 of the BS broadcast or the CS broadcast and the broadcast wave switching information 15 for switching a broadcast wave to the BS broadcast or the CS broadcast may not be displayed.

In this manner, when either of the right side or the left side of the jog dial 21 is pressed, the program list 12 for a broadcast wave different from a broadcast wave corresponding to the program list 12 displayed on the display portion 50 is displayed on the display portion 50, so that it is possible for a user to easily switch broadcast waves even though a switching button for a broadcast wave or the like separated from the jog dial 21 is not included. Additionally, the broadcast wave switching information 15 is displayed on right and left sides of the program list 12, so that a user is able to easily confirm which side of the right side or the left side of the jog dial 21 is pressed.

Figure 9:
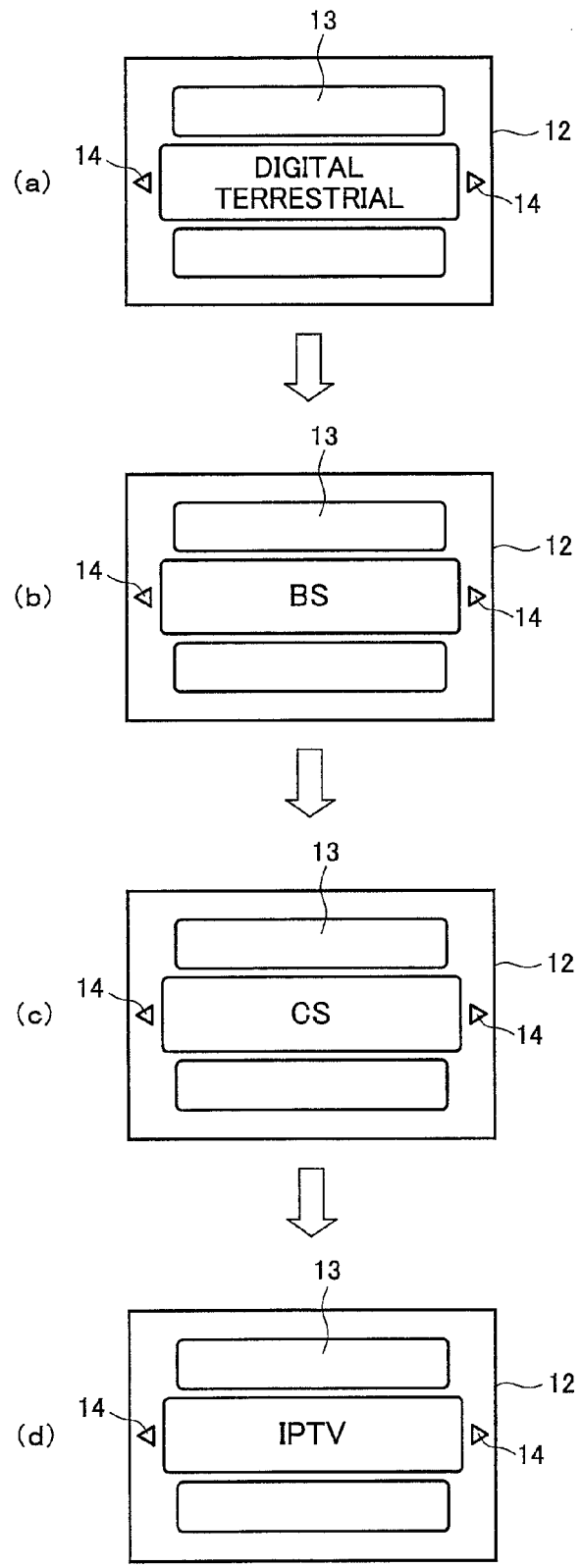
FIG. 9 is a diagram explaining switching of a broadcast wave type in a case where broadcast wave switching information is not displayed.

Further, in the examples of FIG. 7 and FIG. 8, the program list display control portion 55a displays the broadcast wave switching information 15 on right and left sides of the program item 13, however, the broadcast wave switching information 15 may not be displayed. This is because it is sometimes enough that the arrow marks 14 indicating that there is a switchable broadcast wave are displayed in a state where only four types of broadcast waves are provided and the order for switching the broadcast wave is fixed. FIG. 9 is a diagram explaining an example of switching processing of a broadcast wave type in a case where the broadcast wave switching information 15 is not displayed.

When the program list 12 is displayed in a case where a digital terrestrial broadcast is viewed, as shown in FIG. 9, the program item 13 of a program broadcasted from a digital terrestrial broadcast is displayed in the center part, and the arrow marks 14 are displayed on right and left sides thereof, respectively (see FIG. 9(a)). The arrow marks 14 indicate that there are broadcast waves switchable by pressing the right side or the left side of the jog dial 21. When the right side of the jog dial 21 is pressed in this state, the broadcast wave type of the program to be viewed is switched from the digital terrestrial broadcast to a BS broadcast. Further, when the left side of the jog dial 21 is pressed, the broadcast wave type of the program to be viewed is switched from the digital terrestrial broadcast to an IPTV broadcast. When the broadcast wave type is switched to the BS broadcast, the program item 13 of the program broadcasted from the BS broadcast is displayed in the center part, and the arrow marks 14 are displayed on right and left sides thereof, respectively (see FIG. 9(b)).

Moreover, when the right side of the jog dial 21 is pressed in this state, the broadcast wave type of the program to be viewed is switched from the BS broadcast to a CS broadcast. When the broadcast wave type is switched to the CS broadcast, the program item 13 of the program broadcasted from the CS broadcast is displayed in the center part, and the arrow marks 14 are displayed on right and left sides thereof, respectively (see FIG. 9(c)). Thereafter, when the right side of the jog dial 21 is pressed, the broadcast wave type of the program to be viewed is switched from the CS broadcast to the IPTV broadcast. When the broadcast wave type is switched to the IPTV broadcast, the program item 13 of the program broadcasted from the IPTV broadcast is displayed in the center part, and the arrow marks 14 are displayed on right and left sides thereof, respectively (see FIG. 9(d)).

In this manner, the broadcast wave switching information 15 shown in FIGS. 7 and 8 is not displayed, so that the screen is simplified and the program item 13 is easily confirmed. Further, the program video 10 and the program item 13 are able to be displayed larger.

Additionally, the program list 12 shown in FIG. 9 is a looped list in which, when either the right side or the left side of the jog dial 21 is continuously pressed many times, the program item 13 of a broadcast wave that has been displayed in past times is displayed again. However, in a case where the program list 12 is not the looped list and there is no broadcast wave which is selectable next even when a user presses the right side or the left side of the jog dial 21, the program list display control portion 55a may not display the arrow marks 14 on the right side or the left side of the program list 12. Thereby, it is clearly indicated that there is no switchable broadcast wave, thereby improving convenience.

Figure 10:
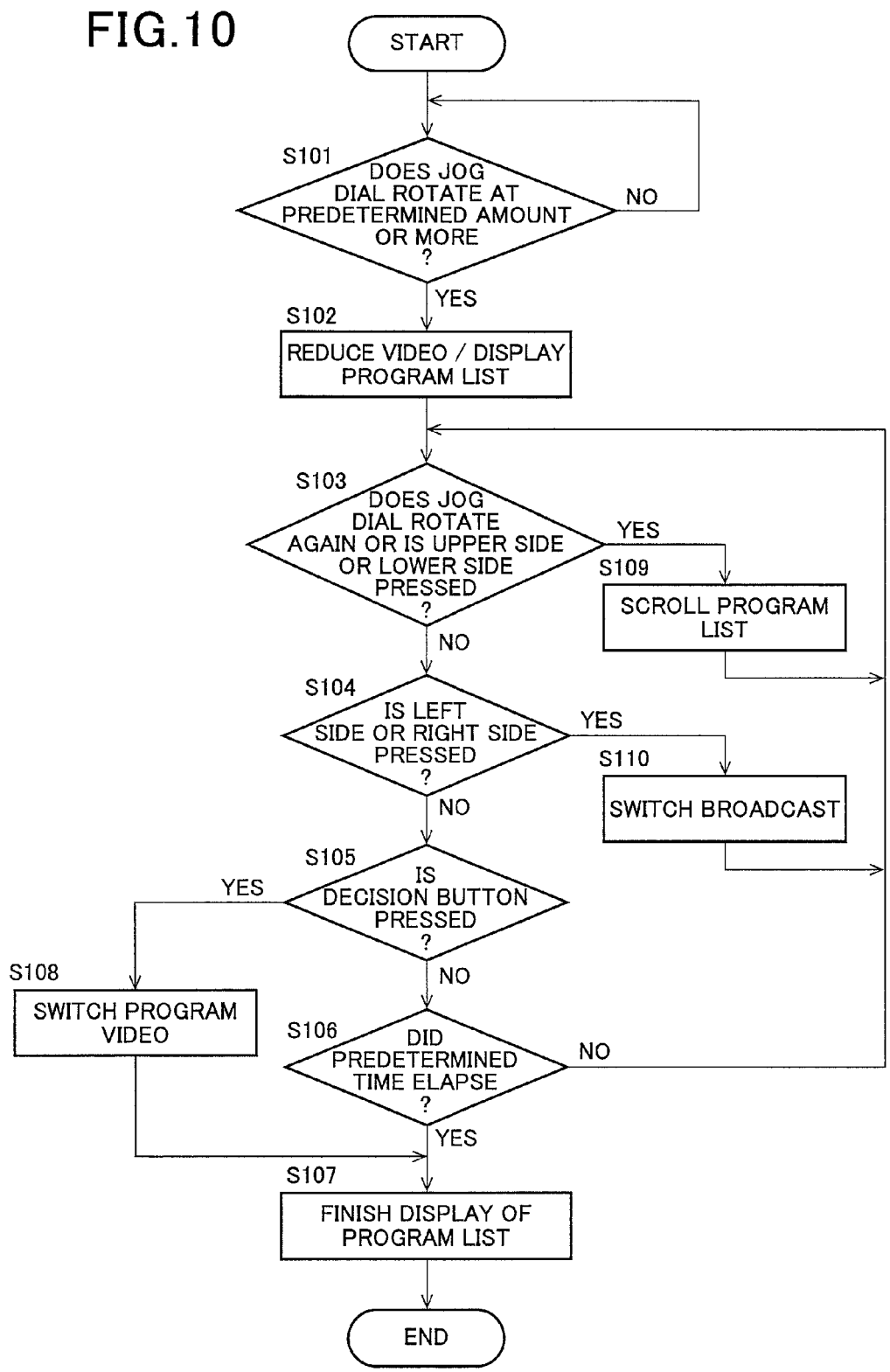
FIG. 10 is a flowchart showing a processing procedure of the video display processing according to the present embodiment.

Next, description will be given for a processing procedure of video display processing according to the present embodiment. FIG. 10 is a flowchart showing a processing procedure of video display processing according to the present embodiment. Note that, it is assumed here that the program video 10 has been already displayed on the full screen of the display portion 50 of the video display device 40. As shown in FIG. 10, the operation detection portion 53 of the video display device 40 determines whether or not the jog dial 21 included in the remote control device 20 rotates at a predetermined amount or more while the program video 10 is displayed on the full screen of the display portion 50 (step S101). For example, an angle of 30 degrees or the like is set in advance as a predetermined amount. Such determination is performed in order to prevent display processing of the program list 12 from being executed by rotation of the jog dial 21 which is not intended by a user.

In a case where the jog dial 21 does not rotate at the predetermined amount or more while the program video 10 is displayed on the full screen of the display portion 50 (in the case of NO at step S101), the process moves to step S101, and the program video 10 that is displayed at that time is continuously displayed on the full screen of the display portion 50, while determination processing of step S101 is repeatedly performed. When the jog dial 21 rotates at the predetermined amount or more while the program video 10 is displayed on the full screen of the display portion 50 (in the case of YES at step S101), the program list display control portion 55a controls the video processing portion 48 to reduce the program video 10 that is displayed at that time while controlling the display portion 50 to display the program list 12 on the right side of the reduced program video 10 (step S102). Note that, a rotational amount of the jog dial 21 may be the predetermined amount or more. The rotational amount of the jog dial 21 is cleared when the program list 12 is displayed and not carried on into the amount to scroll the program list 12. Accordingly, even though a user rotates the jog dial 21 at the predetermined amount or more before the program list 12 is displayed, the program list 12 is displayed and at the same time, the program list 12 is not scrolled accordingly. Further, a display position of the program list 12 is not limited thereto, and the program list 12 may be displayed at the other position. For example, the program list 12 may be displayed in a circular arc shape near the left side of the program video 10, or displayed on the upper side or the lower side of the program video 10. Moreover, the program list 12 may be partially overlapped with the program video 10.

Thereafter, the operation detection portion 53 determines whether or not the jog dial 21 rotates again, or the upper side or the lower side of the jog dial 21 is pressed (step S103). When the jog dial 21 rotates again, or the upper side or the lower side of the jog dial 21 is pressed (in the case of YES at step S103), the program list display control portion 55a controls the video processing portion 48 to scroll and display the program list 12 (step S109). Specifically, when a user rotates the jog dial 21 in a clockwise direction or a user presses the upper side of the jog dial 21, the program item 13 shown in FIG. 5 moves upward, and when a user rotates the jog dial 21 in a counterclockwise direction, or a user presses the lower side of the jog dial 21, the program item 13 moves downward. Thereafter, the process moves to step S103 and subsequent processing is executed.

When the jog dial 21 does not rotate again and the upper side nor the lower side of the jog dial 21 is not pressed at step S103 (in the case of NO at step S103), the broadcast switching control portion 55c determines whether or not a user presses the right side or the left side of the jog dial 21 (step S104).

When a user presses the right side or the left side of the jog dial 21 (in the case of YES at step S104), the broadcast switching control portion 55c switches a broadcast as a display target in the program list 12 to a digital terrestrial broadcast, a BS broadcast, a CS broadcast or an IPTV broadcast as a broadcast wave type designated by a user by pressing the right side or the left side of the jog dial 21 (step S110).

Specifically, as described in FIG. 7 to FIG. 9, the broadcast switching control portion 55c performs processing for switching the program item 13 displayed on the program list 12 to the program item 13 of a program of the digital, terrestrial broadcast, the BS broadcast, the CS broadcast or the IPTV broadcast that is designated by a user by pressing the right side or the left side of the jog dial 21. Thereafter, the process moves to step S103, and subsequent processing is executed.

When a user does not press the left side nor the right side of the jog dial 21 (in the case of NO at step S104), the program switching control portion 55b determines whether or not the decision button 22 of the remote control device 20 shown in FIG. 4 is pressed (step S105). When the decision button 22 is pressed (in the case of YES at step S105), the program switching control portion 55b switches the program video 10 to the program video 10 of a program which is located in the center of a plurality of the program items 13 shown in FIG. 5 and corresponds to the program item 13 that is displayed larger than the other program items 13 (step S108). Then, the program list display control portion 55a finishes display of the program list 12 (step S107). Thereafter, the video display processing is finished.

When the decision button 22 is not pressed at step S105 (in the case of NO at step S105), the operation detection portion 53 determines whether or not a predetermined time elapsed without operating the jog dial 21 by a user (step S106). When the predetermined time does not elapse (in the case of NO at step S106), the process moves to step S103, and subsequent processing is executed. When the predetermined time elapsed (in the case of YES at step S106), the process moves to step S107, and the program list display control portion 55a finishes display of the program list 12. When display of the program list 12 is finished here, the program video 10 of the program that has been selected before the program list 12 is displayed at step S102 is displayed on the full screen of the display portion 50. Thereafter, the video display processing is finished.

Note that, as shown in FIG. 1, while the program item 13 moves up and down, a program video of a channel that has been selected before the program list 12 is displayed is displayed on the left side of the program list 12, however, the program list display control portion 55a may control so that the program items 13 that are displayed in the same size move up and down and at the same time, the program video 10 of the program item 13 in the center is displayed on the left side of the program list 12. This makes it possible to preferably confirm a content of a program also as a video according to movement of the program item 13. Further, the program list display control portion 55a may control so that the center program item 13 is displayed larger than the other program items 13 and at the same time, the program video 10 of the center program item 13 is displayed. Thereby, the center program item 13 is emphasized and at the same time, the program video 10 of the program item 13 is displayed, so that the relation of the program item 13 to the program video 10 is preferably evoked easily.

Additionally, the program list display control portion 55a may control so that, when a user stops movement of the program item 13 and the predetermined time elapsed, the program video 10 of the program item 13 in the center of the program list 12 is displayed. Stopping once of movement of the program item 13 indicates that a user may be interested in the program. Accordingly, the program video 10 of the program item 13 in the center of the program list 12 is displayed and the program video 10 in which a user is interested is viewed by the user, so that the user is able to preferably confirm a content in more detail. Here, the predetermined time that is determined that a user stops movement is about five seconds, for example, since a content of the program item 13 is described simply, so that a user is able to sufficiently confirm the content of description for one or two seconds. Additionally, for a digital terrestrial broadcast, decoding of a video takes some seconds (two to three seconds), thereby possibly resolving reduction in operability due to such a delayed time.

Note that, when the program video 10 of the program item 13 in the center of the program list 12 is displayed on the left side of the program list 12, a channel corresponding to the program video 10 is selected by a tuner portion (second tuner) different from a tuner portion (first timer) selecting a channel corresponding to the program video 10 that has been displayed on the left side of the program list 12 so far.

Specifically, in a case where the program item 13 moves upward or downward, so that the program item 13 of a certain program is next displayed in the center of the program list 12, a tuner portion different from a tuner portion selecting a channel (first channel) corresponding to the program video 10 that is displayed at that time selects in advance a channel of a program (second channel) having the program item 13 that is scheduled to be displayed next in the center of the program list 12.

For example, in a case where the timer portion for digital terrestrial broadcast 42a selects a channel corresponding to the program video 10 that is displayed at that time, the timer portion for digital terrestrial broadcast 42b selects in advance a channel of a program for which the program item 13 is scheduled to be displayed next in the center of the program list 12. The same processing is performed by the tuner portions for BS broadcast 43a and 43b, the timer portions for CS broadcast 44a and 44b and the tuner portions for IPTV broadcast 45a and 45b.

In this manner, the program video 10 that is displayed in the center of the program list 12 is displayed next to the program list 12, so that it is possible to support a user who selects a program to be viewed. Further, a tuner portion different from a tuner portion selecting a channel corresponding to the program video 10 that is displayed at that time selects in advance a channel corresponding to the program video 10 which is scheduled to be displayed next, so that it is possible to smoothly perform processing for scrolling the program item 13 while switching the program video 10.

Additionally, the program list display control portion 55*a* may control so that, instead of displaying the program video 10 of the program item 13 that is scheduled to be displayed next in the center of the program list 12, a still image is extracted from the program video 10 to display the extracted still image. Specifically, the program list display control portion 55*a* may control so that a still image from the program video 10 of a program included in the program list 12 is regularly created and stored in advance, and when one program item 13 is displayed in the center of the program list 12, a still image corresponding to the program item 13 is displayed. Thereby, a load of the video display device 40 to perform scroll display of the program item 13 is reduced.

Further, in the example of FIG. 5, seven program items 13 are displayed in the program list 12, however, the program list display control portion 55*a* may increase or decrease the number of the program items 13 according to speed of rotating the jog dial 21 by a user. Specifically, the operation detection portion 53 detects speed of rotating the jog dial 21 by a user. Then, the program list display control portion 55*a* displays a preset number of the program items 13 in a preset size according to the detected speed. Here, a larger number of program items 13 to be displayed is set as rotational speed is increased, and a smaller size of the program item 13 to be displayed is set as rotational speed is increased. In this manner, a larger amount of the program items 13 is displayed as the rotational speed is increased, so that it is possible for a user to immediately find a desired program to be viewed, while the number of the program items 13 is decreased when the rotational speed is decreased, so that it is possible for a user to easily decide a desired program to be viewed.

Additionally, in the above-described video display processing, in a case where the predetermined time elapsed, the display portion 50 displays the program video 10 of a program that has been selected before the program list 12 is displayed, however, in a case where the predetermined time elapsed, the display portion 50 may display on the full screen the program video 10 of a program that is located in the center of a plurality of the program items 13 of the program list 12 at that time and corresponds to the program item 13 that is displayed larger than the other program items 13. In this manner, even when a user forgets to press the decision button 22, the program video 10 of a program that is selected when the predetermined time elapsed is displayed on the full screen of the display portion 50, thus improving convenience.

Further, in the above-described video display processing, an operation of the jog dial 21 by a user is received while the program list 12 is displayed and a channel is selected, however, the program list display control portion 55*a* may stop display of the program list 12 in a case where an operation except that of the jog dial 21 is performed. For example, in a case where the home button 33 or the tool button 32 for displaying a menu, image quality setting and the like (On-Screen Display) of the video display device 40 are operated, or in a case where the channel selection up/down button 27 is operated for pressing an upper part or a lower part thereof to move the program item 13 upward or downward one by one, thereby selecting a channel, the program list display control portion 55*a* may control so that display of the program list 12 is stopped and the program video 10 corresponding to the above-described setting screen or a selected channel is displayed. This is because an operation for selecting a channel is relatively frequently performed in a short time, while an operation of a menu and an operation for setting image quality or the like are often relatively performed over time, as well as important operations. Moreover, an operation for selecting a channel by the channel selection up/down button 27 is an operation for switching a channel one by one, and such the operation and the operation performed by the jog dial 21 are thus not performed at the same time.

Further, in the above-described video display processing, the program list display control portion 55*a* is configured to control display and scrolling of the program list 12 based on a rotational amount of the jog dial 21 independent of user's ability to operate the jog dial 21 of the remote control device 20, however, may be configured to adjust an output value of the rotational amount of the jog dial 21 based on information on the user's ability for such an operation to perform control for such display and scrolling based on the adjusted output value.

The information on the user's ability for operation includes information on sex, the size of the palm of the hand, an age, right or left handedness and a learning level for the operation of the jog dial 21 of a user, for example. Specifically, the palm of a man's hand is larger than that of a woman's hand, so that a rotational amount of the jog dial 21 of a man is larger than that of a woman in one rotational operation, however, the operation detection portion 53 adjusts an output value of the rotational amount of the jog dial 21 to a smaller value compared to an actual output value, thereby allowing a man and a woman to have the same operability in the jog dial 21. Additionally, in a case where even persons of the same sex have different sizes of palms of their hands, the same processing as the above-described processing is performed, thereby allowing a user with large hands and a user with small hands to have the same operability in the jog dial 21.

Similarly, an adult has a large rotational amount of the jog dial 21 compared to that of a younger person or an old person in one rotational operation, however, the operation detection portion 53 adjusts an output value of a rotational amount of the jog dial 21 to a smaller value compared to an actual output value, thereby allowing an adult, a younger person and an old person to have the same operability in the jog dial 21.

Additionally, depending on a position where the jog dial 21 is provided in the remote control device 20, a rotational amount of the jog dial 21 possibly changes in one rotational operation according to user's right/left handedness, however, the operation detection portion 53 adjusts a rotational amount of the jog dial 21 corresponding to the user's right/left handedness, thereby allowing a right-handed user and a left-handed user to have the same operability in the jog dial 21.

Moreover, a user who is unfamiliar to the operation of the jog dial 21 sometimes has a smaller rotational amount of the jog dial 21 compared to that of a user who is familiar to the operation in one rotational operation, however, the operation detection portion 53 adjusts an output value of a rotational amount of the jog dial 21 to a larger value compared to an actual output value, thereby allowing a user who is unfamiliar to and a user who is familiar to the operation to have the same operability in the jog dial 21.

Here, the degree of adjustment of the output value is changed according to an actual rotational amount (rotation angle). For example, in the case of a smaller actual rotational amount, the operation detection portion 53 adjusts an output value so as not to become too small compared to that for a larger value thereof. This makes it possible to prevent the operation from being less likely to be detected in the case of purposely performing an operation for slightly rotating the jog dial 21.

In the case of performing the above-described adjustment, the operation detection portion 53 receives from a user setting of sex, the size of the palm of the hand, an age, right or left handedness and a learning level for the operation of the jog dial 21. For example, the operation detection portion 53 controls the video processing portion 48 to cause the display portion 50 to display a screen for receiving input of information on sex, the size of the palm of the hand, an age, right or left handedness and a learning level for the operation of the jog dial 21, and receives the above-described information set on the screen with an operation of the remote control device 20 by a user. Then, the operation detection portion 53 stores in the storage portion 54 the received information for setting the sex, the size of the palm of the hand, the age, the right or left handedness and the learning level for the operation of the jog dial 21.

Further, the storage portion 54 is configured to store information on an increasing rate or a decreasing rate of a rotational amount in advance for each combination of sex, the size of the palm of the hand, an age, right or left handedness and a learning level for the operation of the jog dial 21 in association with an actual rotational amount of the jog dial 21 of the remote control device 20.

The operation detection portion 53 then detects, in a case where the jog dial 21 of the remote control device 20 rotates, a rotational amount thereof, while reading information on sex, the size of the palm of the hand, an age, right or left handedness and a learning level for the operation of the jog dial 21 of a user, and further reading information on an increasing rate or a decreasing rate corresponding to the read information from the storage portion 54. Then, the operation detection portion 53 multiplies the detected rotational amount by the increasing or decreasing rate to calculate an output value of the adjusted rotational amount.

This makes it possible to adjust an output value of an actual rotational amount of the jog dial 21, and a user's operation is detected using the adjusted output value, so that it is possible to improve operability in the jog dial 21. Note that, description has been given here for using information on sex, the size of the palm of the hand, an age, right or left handedness and a learning level for the operation of the jog dial 21 of a user as information on user's ability for operation, however, information to be used only needs one or more of the above-described information, and information on user's ability for operation other than the above-described information may be used.

Additionally, in the above-described video display processing, the program list display control portion 55a controls display and scrolling of the program list 12 based on a rotational amount of the jog dial 21 of the remote control device 20 independent of a form and a size of the remote control device 20, however, may adjust an output value of the rotational amount of the jog dial 21 based on the form and/or the size of the remote control device 20 to control such display and scrolling based on the adjusted output value.

For example, a portable video display device 40 is provided with a small remote control device 20 in some cases. The jog dial 21 of such the remote control device 20 has a larger rotational amount in one rotational operation compared to that of the jog dial 21 of a large remote control device 20 with many buttons. Moreover, there is a possibility that a rotational amount in one rotational operation varies among remote control devices 20 in varied forms.

Therefore, the operation detection portion 53 adjusts an output value of a rotational amount of the jog dial 21 to a smaller value compared to an output value of an actual rotational amount, thereby allowing a small remote control device 20 and a large remote control device 20 to have the same operability in jog dial 21. Further, the output value of the rotational amount is adjusted even among remote control devices 20 in varied forms, thereby allowing operability in jog dial 21 to be equal.

In this case, the remote control device 20 includes an identifier for identifying a form and a size of the remote control device 20 in a remote control signal transmitted in the case of performing an operation by a user. Such an identifier may be information on a model number of the remote control device 20 or the like. Then, the remote control signal reception portion 52 of the video display device 40 receives the remote control signal, and the operation detection portion 53 extracts the identifier from the remote control signal.

Further, the storage portion 54 is configured to have information on an increasing rate or a decreasing rate of a rotational amount stored therein in advance for each form and size of the remote control device 20 in association with an actual rotational amount of the jog dial 21 of the remote control device 20.

The operation detection portion 53 then detects, when the jog dial 21 of the remote control device 20 rotates, a rotational amount thereof, while reading from the storage portion 54 information on an increasing rate or a decreasing rate corresponding to the identifier of the remote control device 20, and multiplies the detected rotational amount by the increasing rate or the decreasing rate to calculate an output value of the adjusted rotational amount.

This makes it possible to adjust an output value of an actual rotational amount of the jog dial 21, and a user's operation is detected using the adjusted output value, so that it is possible to improve operability in the jog dial 21. Note that, description has been given here for using information on a form and a size, however, information to be used only needs any one of the information on the form and the size.

Additionally, in the above-described video display processing, as described in FIG. 5, the program list display control portion 55a causes the display portion 50 to display the program list 12 including the program items 13 of some of programs for which a video is receivable, however, in order to allow a program having a video desired to be displayed to be selected promptly from the program list 12 in cases such as that there are too many programs or that a display instruction given by a user is received, may cause the display portion 50 to display a program search figure in which the above-described some of programs and programs other than the some of programs are associated in different positions, respectively, and causes the display portion 50 to display the program list 12 including the searched program using the program search figure.

Figure 11:
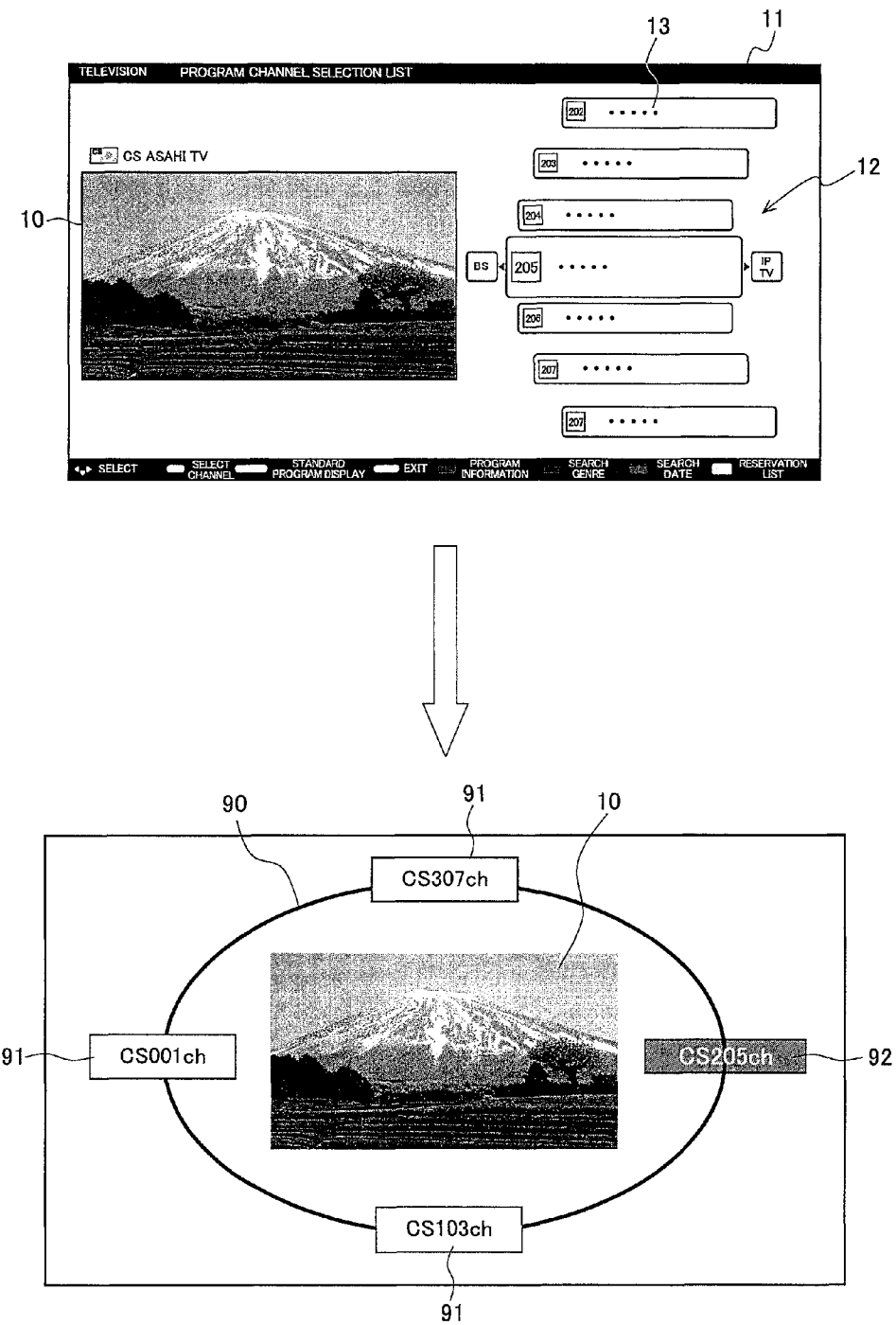
FIG. 11 is a diagram explaining an example of a program search figure.

FIG. 11 is a diagram explaining an example of a program search figure 90. In this video display processing, similarly to the video display processing shown in FIG. 10, in a case where the jog dial 21 on the remote control device 20 rotates at a predetermined amount or more, the program list display control portion 55a controls the video processing portion 48 to display a program video 10 and the program list 12 on the display portion 50. Then, in a case where the number of programs for which a video is receivable is the predetermined number or more, and rotation of the jog dial 21 is continued for a predetermined time, the program list display control portion 55a displays the program search figure 90 on the display portion 50.

FIG. 11 shows the program video 10 of a program selected in the program list 12 and the program search figure 90. This program search figure 90 includes an oval part. In addition, a program having the program item 13 included in the program list 12 and programs other than that are arranged in an order of a channel number to be associated in different positions on the oval part. On the other hand, program items 13 are arranged in an order of a channel number also in the program list 12.

Moreover, the program search figure 90 includes program display sections 91 indicating positions of representative programs on the oval part and a searched program display section 92 of a searched program. Note that, in the example of FIG. 11, a display position of a program display section 91 with a channel number of 205 is overlapped with a display position of the searched program display section 92, and thus the program display section 91 is not displayed.

Here, the program list display control portion 55*a* changes a program for which the program display section 91 is displayed according to the number of programs to be associated in the oval part. For example, as shown in FIG. 11, in the case of displaying four program display sections 91, the program list display control portion 55*a* selects representative programs so that intervals between channel numbers to be displayed in adjacent program display sections 91 are almost the same.

For example, in a case where the number of programs to be associated in the oval part is 408, the program list display control portion 55*a* selects programs having channel numbers of 1, 103 (=1+408/4), 205(=1+408/4×2), and 307(=1+408/4×3) to display the program display sections 91 indicating these channel numbers. In addition, the program list display control portion 55*a* may select programs having nice round channel numbers of 1, 100, 210, 310 and the like to display the program display section 91 indicating these channel numbers. Note that, the number of the program display sections 91 to be displayed is not limited to four but eight or the like.

Figure 12:
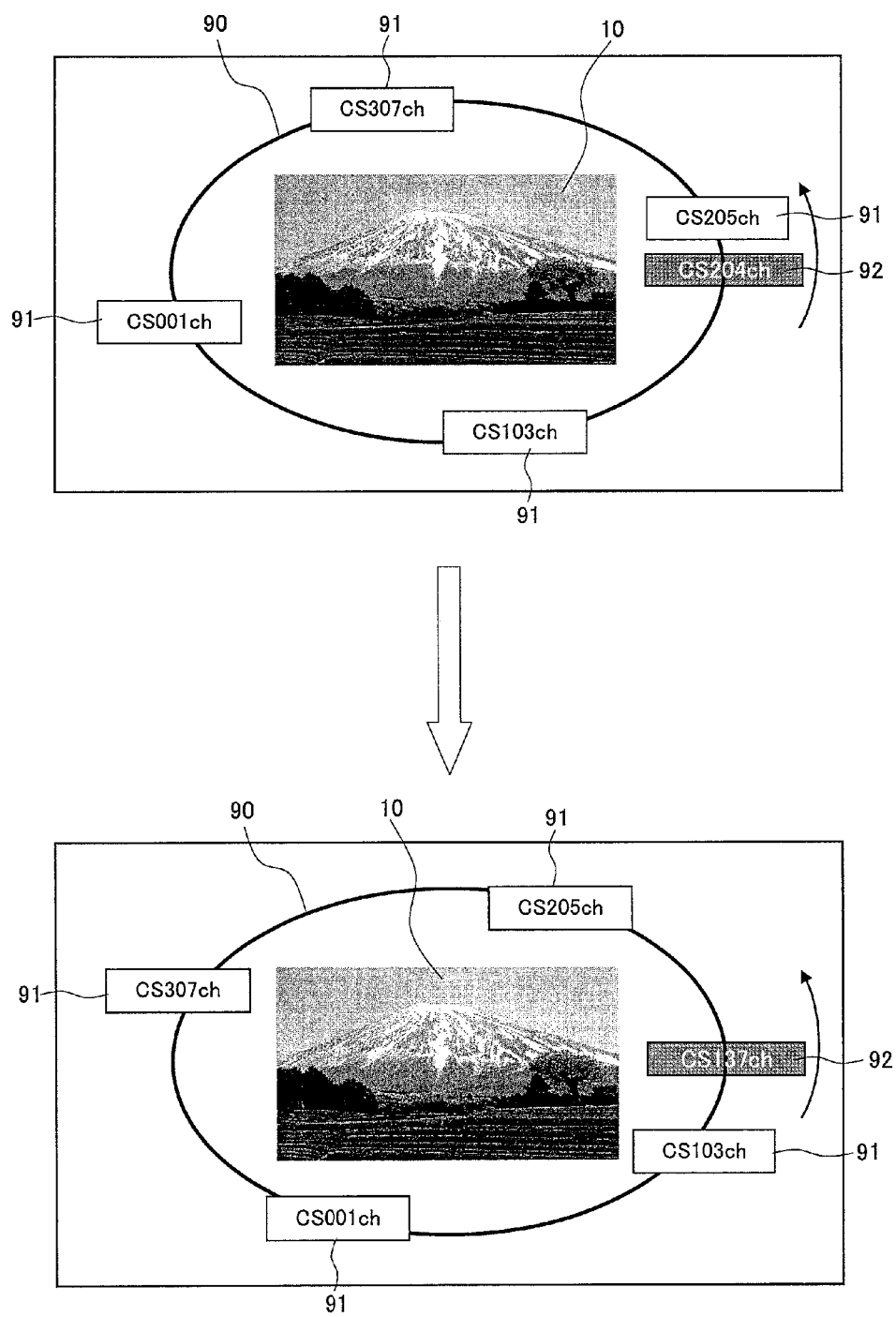
FIG. 12 is a diagram showing an example of change in display of program display sections and a searched program display section.

Then, the program list display control portion 55*a* changes display of the program display sections 91 and the searched program display section 92 according to an operation of the jog dial 21 by a user. FIG. 12 is a diagram showing an example of change in display of the program display sections 91 and the searched program display section 92.

For example, in the state of the program search figure 90 shown in FIG. 11, in a case where a user rotates the jog dial 21, as shown in FIG. 12, the program list display control portion 55*a* moves each position on the oval part in which each program is associated along circumference of the oval part according to the rotation. Accordingly, the program list display control portion 55*a* also moves the program display sections 91 along the circumference.

Moreover, the program list display control portion 55*a* does not change the display position of the searched program display section 92 but displays on the searched program display section 92 a channel number of a program which is associated in the oval part and at the display position of the searched program display section 92. Speed at which display of channel numbers is switched along with the rotation of the jog dial 21 (this speed is the same as the speed at which each position on the oval part in which each program is associated is moved along the circumference of the oval part) is set to speed faster than speed at which the program items 13 are switched on the program list 12 according to the same rotation of the jog dial 21.

On the program search figure 90 in which switching speed of display of channel numbers is fast, a user does not need to directly select a channel number of a program with a video desired to be displayed, but only need to select a program having a channel number close to the channel number. In this case, on the program list 12, a program item 13 corresponding to the selected program and the program items 13 of programs having channel numbers close to the program are displayed, so that the user is able to correctly select the program with the video desired to be displayed with reference to the program list 12.

Note that, here, according to the rotation of the jog dial 21, each position on the oval part and the searched program display section 92 are moved and display on the searched program display section 92 is switched, however, each position on the oval part and the searched program display section 92 may be moved and display on the searched program display section 92 may be switched in a case where the upper side or the lower side of the jog dial 21 is pressed.

In addition, the program list display control portion 55*a* may cause the display portion 50 to perform the display of the program search figure 90 by switching with the program selection screen 11 in which the program list 12 as shown in FIG. 11 is displayed, or display the program search figure 90 to be overlapped with the program selection screen 11.

Figure 13:
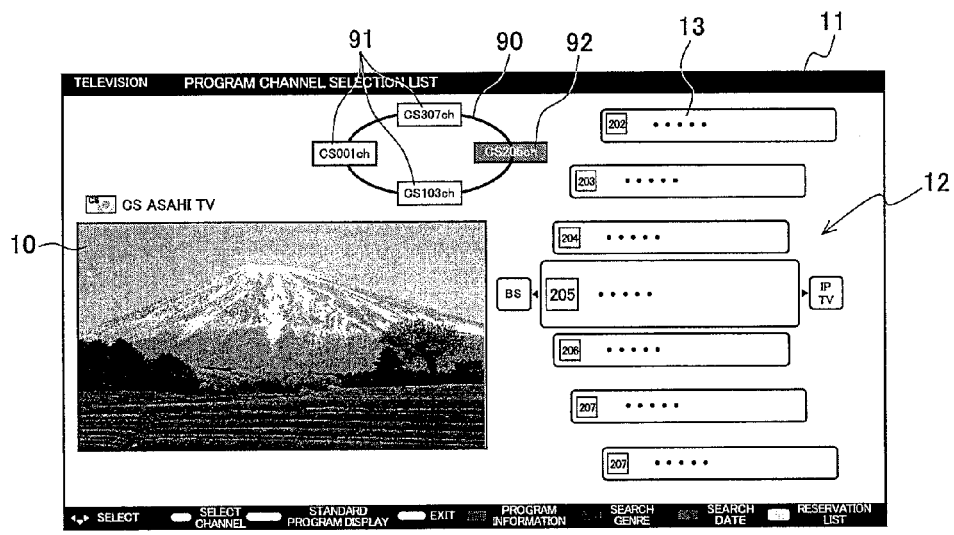
FIG. 13 is a diagram showing an example of displaying the program search figure on a space area of a program selection screen.
Figure 14:
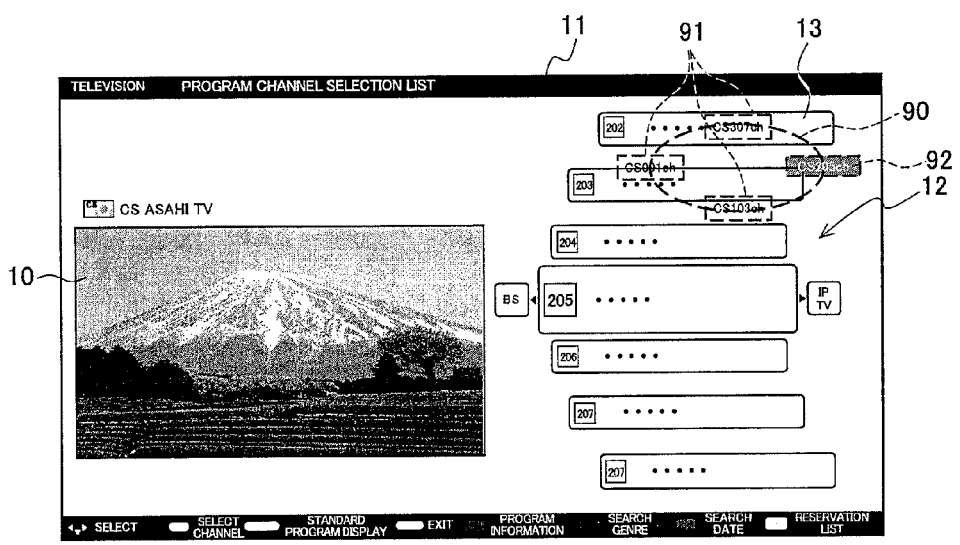
FIG. 14 is a diagram showing an example of displaying the program search figure translucently on the program selection screen.

FIG. 13 is a diagram showing an example of displaying the program search figure 90 on a space area of the program selection screen 11. In addition, FIG. 14 is a diagram showing an example of displaying the program search figure 90 translucently on the program selection screen 11. In this manner, switching screens does not occur by displaying the program search figure 90 on the program selection screen 11, thus making a screen easy to see.

Moreover, while a user searches a program using the program search figure 90, the program list display control portion 55*a* may cause the display portion 50 to execute processing for displaying a channel number of a program on the searched program display section 92 while causing the display portion 50 to display the program list 12 so that a program item 13 of a program corresponding to the channel number is always displayed on the center of the program list 12.

In addition, in the example of FIG. 11, display is performed so that the searched program display section 92 is placed on the right side of the screen. The program list 12 was displayed on the right side of the screen also in the original program selection screen 11, therefore, by performing such display, a user is able to confirm a position of the searched program display section 92 smoothly on a screen on which the program search figure 90 is displayed.

Figure 15:
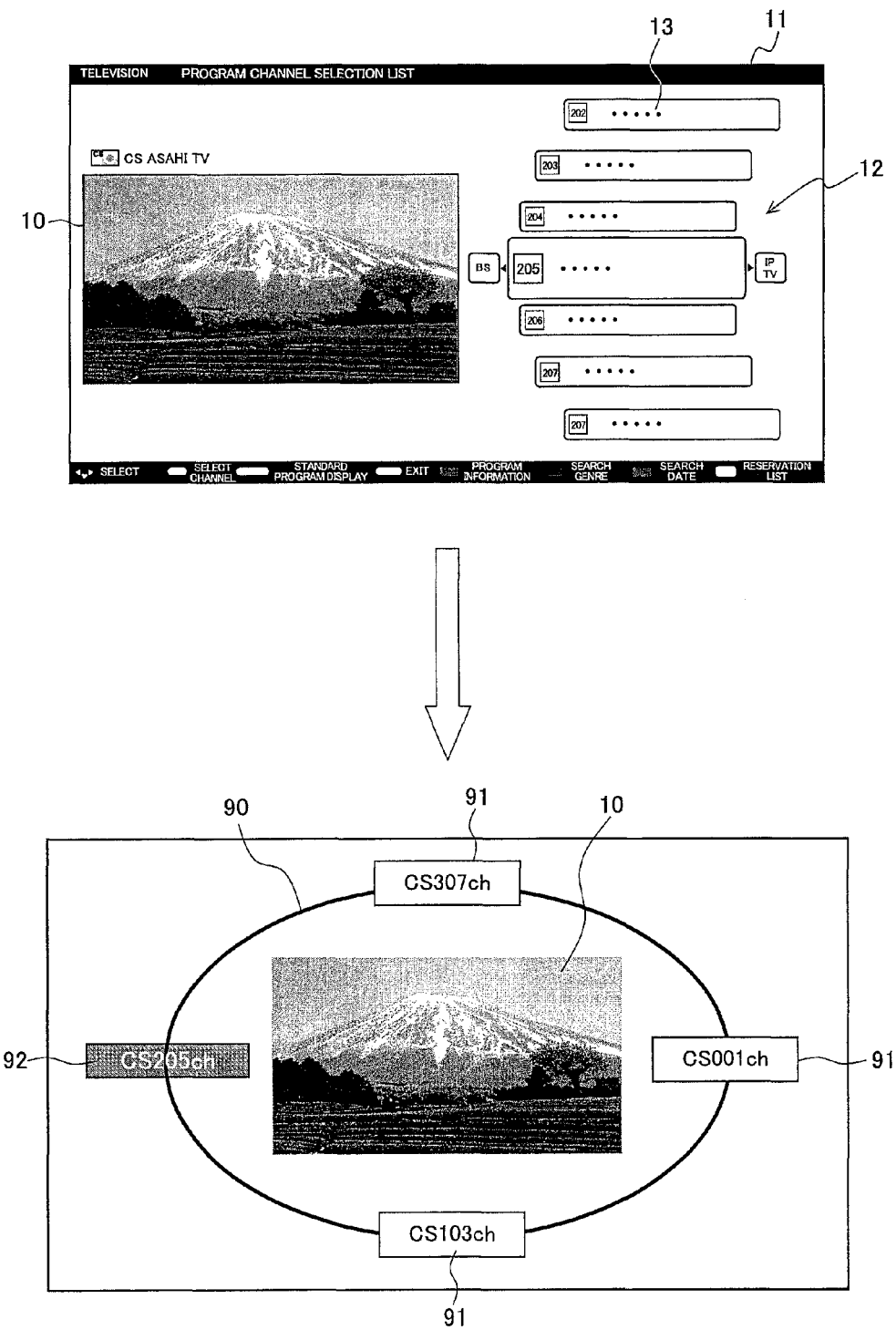
FIG. 15 is a diagram showing another example of display of the searched program display section.

Moreover, the searched program display section 92 may be displayed on the left side of the program search figure 90. FIG. 15 is a diagram showing another example of display of the searched program display section 92. In the program list 12 on the original program selection screen 11, the program items 13 are arrayed in a circular arc shape which protrudes toward the left side, and in the center thereof, a program item 13 of a program which is selected at that time is displayed, however, the searched program display section 92 is displayed on the center of an arc part which protrudes toward the left side of the program search figure 90 by performing display like FIG. 15, and a user is thus able to easily confirm the position of the searched program display section 92 on the screen on which the program search figure 90 is displayed.

Figure 16:
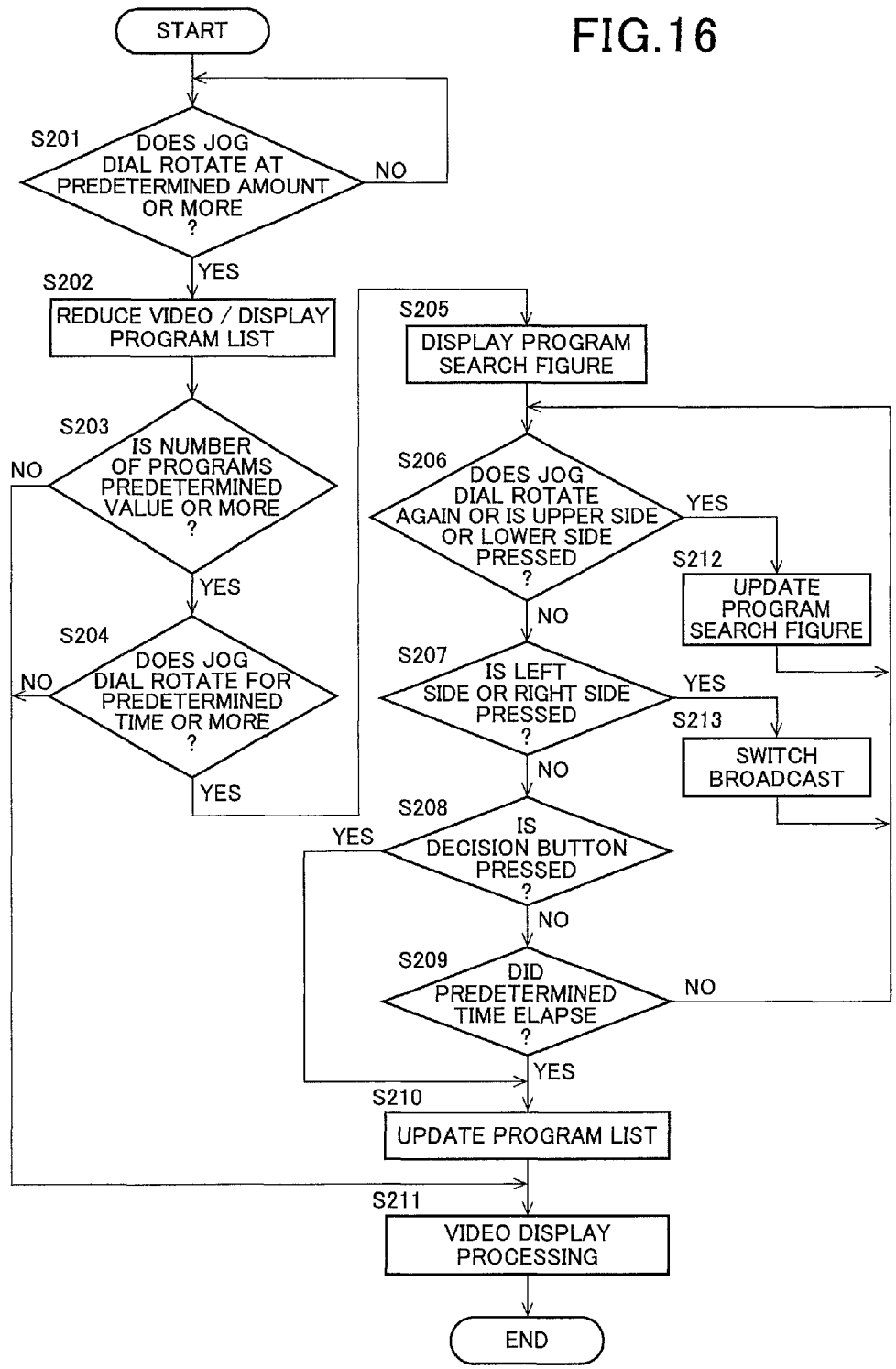
FIG. 16 is a flowchart showing an example of a processing procedure of the video display processing using the program search figure.

Next, description will be given for an example of a processing procedure of video display processing using the program search figure 90. FIG. 16 is a flowchart showing an example of a processing procedure of the video display processing using the program search figure 90. Also in the present video display processing, similarly to the video display processing shown in FIG. 10, the program video 10 is displayed on the full screen of the display portion 50 of the video display device 40.

As shown in FIG. 16, the operation detection portion 53 of the video display device 40 determines whether or not the jog dial 21 provided in the remote control device 20 rotates at a predetermined amount or more while the program video 10 is displayed on the full screen of the display portion 50 (step S201).

In a case where the jog dial 21 does not rotate at the predetermined amount or more while the program video 10 is displayed on the full screen of the display portion 50 (in the case of NO at step S201), the process moves to step S201, and the program video 10 is continuously displayed on the full screen of the display portion 50, while determination processing of step S201 is repeatedly performed. When the jog dial 21 rotates at the predetermined amount or more while the program video 10 is displayed on the full screen of the display portion 50 (in the case of YES at step S201), the program list display control portion 55a controls the video processing portion 48 to reduce the program video 10 that is displayed at that time while controlling the display portion 50 to display the program list 12 on the right side of the reduced program video 10 (step S202).

Subsequently, the program list display control portion 55a determines whether or not the number of programs for which a video is receivable is a predetermined value or more (step S203). When the number of programs for which a video is receivable is not the predetermined value or more (in the case of NO at step S203), video display processing is executed (step S211). This video display processing is processing similar to processing from step S103 to step S110 in FIG. 10, and processing for receiving selection of a program having a video displayed using the program list 12 from a user.

When the number of programs for which a video is receivable is the predetermined value or more (in the case of YES at step S203), the program list display control portion 55a determines whether or not the user rotates the jog dial 21 for a predetermined time or more (step S204). Then, when the user does not rotate the jog dial 21 for a predetermined time or more (in the case of NO at step S204), video display processing similar to the processing from step S103 to step S110 in FIG. 10 is executed (step S211).

When the user rotates the jog dial 21 for a predetermined time or more (in the case of YES at step S204), the program list display control portion 55a controls the display portion 50 to display the program search figure 90 (step S205).

Thereafter, the operation detection portion 53 determines whether or not the jog dial 21 rotates again, or the upper side or the lower side of the jog dial 21 is pressed (step S206). When the jog dial 21 rotates again, or the upper side or the lower side of the jog dial 21 is pressed (in the case of YES at step S206), the program list display control portion 55a controls the video processing portion 48 to update the program search figure 90 (step S212).

Specifically, the program list display control portion 55a moves each position on the oval part in which each program is associated along circumference of the oval part according to the rotation of the jog dial 12 or pressing of the upper side or the lower side of the jog dial 21. Accordingly, the program list display control portion 55a also moves the program display sections 91 along the circumference. In addition, the program list display control portion 55a displays a channel number of a program which is associated in the oval part and at the display position of the searched program display section 92 on the searched program display section 92. Subsequently, the process moves to step S206, and subsequent processing is executed.

At step S206, when the jog dial 21 does not rotate again and the upper side nor the lower side of the jog dial 21 is not pressed (in the case of NO at step S206), the broadcast switching control portion 55c determines whether or not a user presses the left side or the right side of the jog dial 21 (step S207).

When a user presses the left side or the right side of the jog dial 21 (in the case of YES at step S207), the broadcast switching control portion 55c switches a broadcast as a display target in the program list 12 to a digital terrestrial broadcast, a BS broadcast, a CS broadcast, or an IPTV broadcast as a broadcast wave type designated by a user by pressing the left side or the right side of the jog dial 21 (step S213). Thereafter, the process moves to step S206 and subsequent processing is executed.

When a user does not press the left side nor the right side of the jog dial 21 (in the case of NO at step S207), the program list display control portion 55a determines whether or not the decision button 22 of the remote control device 20 shown in FIG. 4 is pressed (step S208). When the decision button 22 is pressed (in the case of YES at step S208), the program list display control portion 55a updates the program list 12 (step S210).

Specifically, the program list display control portion 55a causes the display portion 50 to display the program list 12 which displays a program item 13 of a program of a channel number which is displayed in the searched program display section 92 at that time on the center thereof.

When the decision button 22 is not pressed (in the case of NO at step S208), the program list display control portion 55a determines whether or not a predetermined time elapsed since the program search figure 90 had been displayed at step S205 (step S209). When the predetermined time does not elapse (in the case of NO at step S209, the process moves to step S206 and subsequent processing is executed.

When the predetermined time elapsed (in the case of YES at step S209), the program list display control portion 55a updates the program list 12 (step S210). Specifically, the program list display control portion 55a causes the display portion 50 to display the program list 12 which displays a program item 13 of a program of a channel number which is displayed in the searched program display section 92 at that time on the center thereof. Subsequently, video display processing similar to the processing from step S103 to step S110 in FIG. 10 is executed (step S211).

Note that, in the video display processing shown in FIG. 16, when the number of programs for which a video is receivable is a predetermined value or more, and a user rotates the jog dial 21 for a predetermined time or more, the program list display control portion 55a causes the display portion 50 to display the program search figure 90, however, the program search figure 90 may be displayed on the display portion 50 in either of a case where the number of programs for which a video is receivable is a predetermined value or more, or a case where a user rotates the jog dial 21 for a predetermined time or more.

Description has so far been given mainly for embodiments of the video display device and the video display method, however, the present invention is not limited to these embodiments, and the present invention may be implemented as a form of a computer program for realizing functions of the video display device, or a form of a computer-readable recording medium having the computer program recorded thereon.

In the embodiments, various forms of recording media are allowed to be employed including disc types (for example, a magnetic disc, an optical disc and the like), card types (for example, a memory card, an optical card and the like), semiconductor memory types (for example, a ROM, a non-volatile memory and the like), tape types (for example, a magnetic tape, a cassette tape and the like), and the like.

Computer programs that realize the functions of the video display device in the above-described embodiments or computer programs that cause a computer to execute the video display method are recorded on these recording media to be distributed, thereby making it possible to reduce cost and to improve portability and versatility.

Subsequently, a computer is equipped with the above-described recording medium, then the computer program that is recorded in the recording medium is read by the computer to be stored in a memory, and a processor provided in the computer (CPU: Central Processing Portion, MPU: Micro Processing Portion) reads the computer program from the memory to execute, so that it is possible to realize the functions of the video display device according to the present embodiments and execute the video display method.

Further, the present invention is not limited to the above-described embodiments, and various changes and modifications are able to be made without departing from the spirit of the present invention.

EXPLANATIONS OF LETTERS OR NUMERALS

10 . . . program video; 11 . . . program selection screen; 12 . . . program list; 13 . . . program item; 14 . . . arrow mark; 15 . . . broadcast wave switching information; 20 . . . remote control device; 21 . . . jog dial; 22 . . . decision button; 23 . . . return button; 24 . . . exit button; 25 power on/off button; 26 . . . volume up/down button; 27 . . . channel selection up/down button; 28 . . . data broadcast display button; 29a to 29d . . . data broadcast color key; 30 . . . number button; 31 . . . application button; 32 . . . tool button; 33 . . . home button; 34 . . . program guide button; 40 . . . video display device; 41 . . . network interface portion; 42a, 42b . . . tuner portion for digital terrestrial broadcast; 43a, 43b . . . tuner portion for BS broadcast; 44a, 44b . . . tuner portion for CS broadcast; 45a, 45b . . . tuner portion for IPTV broadcast; 46 . . . selector portion; 47 . . . decode portion; 48 . . . video processing portion; 49 . . . sound processing portion; 50 . . . display portion; 51 . . . speaker; 52 . . . remote control signal reception portion; 53 . . . operation detection portion; 54 . . . storage portion; 55 . . . control portion; 55a . . . program list display control portion; 55b . . . program switching control portion; 55c . . . broadcast switching control portion; 60 . . . digital terrestrial broadcasting antenna; 70 . . . BS/CS broadcasting antenna; 80 . . . channel number; 81 . . . broadcast station logo; 82 . . . triple-digit channel number; 83 . . . broadcast station name; 84 . . . program name; 90 . . . program search figure; 91 . . . program display section; and 92 . . . searched program display section.

The invention claimed is:

1. A video display device for displaying a video of a program which is selected using a remote control device which does not have a channel selection button corresponding to each channel, comprising:
a display portion for displaying the video of the program;
an operation detection portion for detecting a rotational operation of a jog dial provided in the remote control device; and
a control portion for causing the display portion to display a program list including a plurality of program items associated with different programs while causing the display portion to display the video of the program when the rotational operation is detected by the operation detection portion while the video of the program is displayed on a full screen of the display portion, wherein
the control portion causes the display portion to display a video of a program which is selected using the program list by the rotational operation of the jog dial, and a program item included in the program list is a program item of some of programs for which the video is receivable, the control portion causes the display portion to display a program search figure in which the some of programs and programs other than the some of programs are associated in different positions, and causes the display portion to display, when a program is searched using the program search figure, a program list including the program which is searched.

2. The video display device as defined in claim 1, wherein the control portion causes the display portion to display the program search figure when the total number of the some of programs and the programs other than the some of programs is the predetermined number or more.

3. The video display device as defined in claim 1, wherein the control portion causes the display portion to display the program search figure when the operation detection portion detects that the rotational operation is performed for a predetermined time or more.

4. The video display device as defined in claim 1, wherein the control portion causes the display portion to display the program search figure together with the video of the program and the program list.

5. A video display device for displaying a video of a program, comprising:
a display portion for displaying the video of the program;
an operation detection portion for detecting a rotational operation of a jog dial provided in a remote control device; and
a control portion for causing the display portion to display a program list including a plurality of program items associated with different programs while causing the display portion to display the video of the program when the rotational operation is detected by the operation detection portion while the video of the program is displayed on a full screen of the display portion, wherein
a program item included in the program list is a program item of some of programs for which the video is receivable, the control portion causes the display portion to display a program search figure in which the some of programs and programs other than the some of programs are associated in different positions, and causes the display portion to display, when a program is searched using the program search figure, a program list including the program which is searched.

6. The video display device as defined in claim 5, wherein the control portion causes the display portion to display a video of a program selected using the program list by the rotational operation of the jog dial.

7. The video display device as defined in claim 5, wherein the control portion causes the display portion to display a program item corresponding to the program selected by the rotational operation of the jog dial in the program list, in a display form which is different from that of a program item corresponding to other programs.

8. The video display device as defined in claim 5, wherein the control portion causes the display portion to display, a video of the program which is selected, when a predetermined button of the remote control device is pressed in a state where one program is selected by the rotational operation of the jog dial.

9. The video display device as defined in claim 5, wherein the control portion causes the display portion to display, a video of the program which is selected, in a case where a predetermined time elapsed in a state where one program is selected by the rotational operation of the jog dial.

10. The video display device as defined in claim 5, wherein the operational detection portion further detects an operation of pressing either of the right side or the left side of the jog dial, and the control portion causes the display portion to display, a program list for a broadcast wave type which is different from a broadcast wave type corresponding to the program list displayed on the display portion, when either of the right side or the left side of the jog dial is pressed in a state where the program list is displayed on the display portion.

11. The video display device as defined in claim 10, wherein the control portion causes the display portion to display, at right and left positions of the program list, broadcast wave switching information indicating the broadcast wave type which is different from the broadcast wave type corresponding to the program list displayed on the display portion.

12. The video display device as defined in claim 5, further comprising:

a first tuner portion for selecting a first channel; and a second tuner portion for selecting a second channel, wherein the second tuner portion selects the second channel while the program list is displayed on the display portion and a program corresponding to the first channel selected by the first tuner portion is displayed on the display portion, and the control portion causes the display portion to display, a video of the program corresponding to the second channel when a program corresponding to the second channel is selected by the rotational operation of the jog dial.

13. The video display device as defined in claim 5, further comprising:

a first tuner portion for selecting a first channel; and a second tuner portion for selecting a second channel, wherein the second tuner portion selects the second channel while the program list is displayed on the display portion and a program corresponding to the first channel selected by the first tuner portion is displayed on the display portion, and the control portion extracts a still image from a video of a program of the second channel selected by the second tuner portion and causes the display portion to display the still image when a program corresponding to the second channel is selected by the rotational operation of the jog dial.

14. The video display device as defined in claim 5, wherein the operation detection portion detects rotational speed of the jog dial, and the control portion changes the number of the program items to be displayed on the display portion according to the rotational speed detected by the operation detection portion.

15. The video display device as defined in claim 5, wherein the operation detection portion adjusts an output value of a rotational amount of the jog dial according to information on an operator's ability for operation of the remote control device and detects the rotational operation based on the adjusted output value.

16. The video display device as defined in claim 5, wherein the operation detection portion adjusts the output value of the rotational amount of the jog dial according to a form and/or size of the remote control device, and detects the rotational operation based on the adjusted output value.

17. A video display method of displaying a video of a program, comprising:

an operation detection step of detecting a rotational operation of a jog dial provided in a remote control device; and a program list display step of causing the display portion to display a program list including a plurality of program items associated with different programs while causing the display portion to display the video of the program when the rotational operation is detected while the video of the program is displayed on a full screen of the display portion for displaying the video of the program at the operation detection step, wherein a program item included in the program list is a program item of some of programs for which the video is receivable, and at the program list display step, a program search figure in which the some of programs and programs other than the some of programs are associated in different positions is displayed on the display portion, and when a program is searched using the program search figure, a program list including the program which is searched is displayed on the display portion.

* * * * *